United States Patent
Russo et al.

(10) Patent No.: US 6,596,398 B1
(45) Date of Patent: Jul. 22, 2003

(54) SOLAR CONTROL COATED GLASS

(75) Inventors: David A. Russo, Norristown, PA (US); Clem S. McKown, Glenmoore, PA (US); Christophe Roger, Limerick, PA (US); Jeffrey L. Stricker, Wynnewood, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/699,681

(22) Filed: Oct. 30, 2000

Related U.S. Application Data

(63) Continuation-in-part of application No. 09/249,761, filed on Feb. 16, 1999, now Pat. No. 6,218,018.
(60) Provisional application No. 60/097,523, filed on Aug. 21, 1998.

(51) Int. Cl.[7] .............................. B32B 17/06
(52) U.S. Cl. ................. 428/432; 428/426; 428/688; 428/689; 428/697; 428/699; 428/701; 428/702
(58) Field of Search ................ 428/432, 699, 428/701, 702, 216, 426, 688, 689, 697

(56) References Cited

U.S. PATENT DOCUMENTS

| 3,149,989 A | 9/1964 | Johnson |
| 4,187,336 A | 2/1980 | Gordon |

(List continued on next page.)

FOREIGN PATENT DOCUMENTS

| CA | 2193158 | 6/1997 |
| CZ | CS239788 | 1/1986 |

(List continued on next page.)

OTHER PUBLICATIONS

E. Shanthi, et al., "Dopant Effects In Sprayed Tin Oxide Films," Thin Solid Films, Elsevier Sequoia (The Netherlands), No. 88, p. 93–100, (1982). (No month).

B. Stjema, et al., "Optical and Electrical Properties of Radio Frequency Sputtered Tin Oxide Films Doped With Oxygen Vacancies, F, Sb, or Mo," J. Appl. Phys., American Insitute of Physics, vol. 76 (No. 6), p. 3797–3817, (Sep. 15, 1994).

*Primary Examiner*—Deborah Jones
*Assistant Examiner*—Andrew T Piziali
(74) *Attorney, Agent, or Firm*—Nicholas J. DeBenedictis

(57) ABSTRACT

A solar-control glass that has acceptable visible light transmission, absorbs near infrared wavelength light (NIR) and reflects midrange infrared light (low emissivity mid IR) along with a preselected color within the visible light spectrum for reflected light is provided. Also provided is a method of producing the improved, coated, solar-controlled glass. The improved glass has a solar energy (NIR) absorbing layer comprising tin oxide having a dopant such as antimony and a low emissivity control layer (low emissivity) capable of reflecting midrange infrared light and comprising tin oxide having fluorine and/or phosphorus dopant. A separate iridescence color suppressing layer as described in the prior art is generally not needed to achieve a neutral (colorless) appearance for the coated glass, however an iridescence suppressing layer or other layers may be combined with the two layer assemblage provided by the present invention. If desired, multiple solar control and/or multiple low emissivity layers can be utilized. The NIR layer and the low emissivity layer can be separate portions of a single tin oxide film since both layers are composed of doped tin oxide. A method of producing the coated solar control glass is also provided.

18 Claims, 11 Drawing Sheets

U.S. PATENT DOCUMENTS

| | | |
|---|---|---|
| 4,265,974 A | 5/1981 | Gordon |
| 4,287,009 A | 9/1981 | Allegra et al. |
| 4,504,109 A | 3/1985 | Taga et al. |
| 4,583,815 A | 4/1986 | Taga et al. |
| 4,590,096 A | 5/1986 | Lindner |
| 4,601,917 A | 7/1986 | Russo et al. |
| 4,743,506 A * | 5/1988 | Russo et al. ............... 428/389 |
| 4,828,880 A | 5/1989 | Jenkins et al. |
| 4,853,257 A | 8/1989 | Henery |
| 4,900,634 A | 2/1990 | Terneu et al. |
| 5,168,003 A | 12/1992 | Proscia |
| 5,780,149 A | 7/1998 | McCurdy et al. |
| 6,048,621 A | 4/2000 | Gallego et al. |
| 6,124,026 A * | 9/2000 | McCurdy et al. ........... 428/216 |
| 6,231,971 B1 | 5/2001 | Terneu et al. |

FOREIGN PATENT DOCUMENTS

| | | |
|---|---|---|
| EP | 0520720 A1 * | 6/1992 |
| EP | 0735009 A1 | 10/1996 |
| EP | 0546302 B1 | 7/1997 |
| GB | 2200139 A | 7/1988 |
| GB | 2302101 A | 1/1997 |
| GB | 2302102 A | 1/1997 |
| JP | 06150741 | 5/1994 |
| JP | 07094044 | 4/1995 |
| WO | WO 98/11031 | 3/1998 |
| WO | WO 99/02336 | 1/1999 |
| WO | WO 0055102 A | 9/2000 |

* cited by examiner

FIGURE 16: Reflected color of TOF/TOSb bilayer films as a function of precursor $SbCl_3$ content and film thickness of TOSb film. The TOF film thickness was held constant (300 nm).

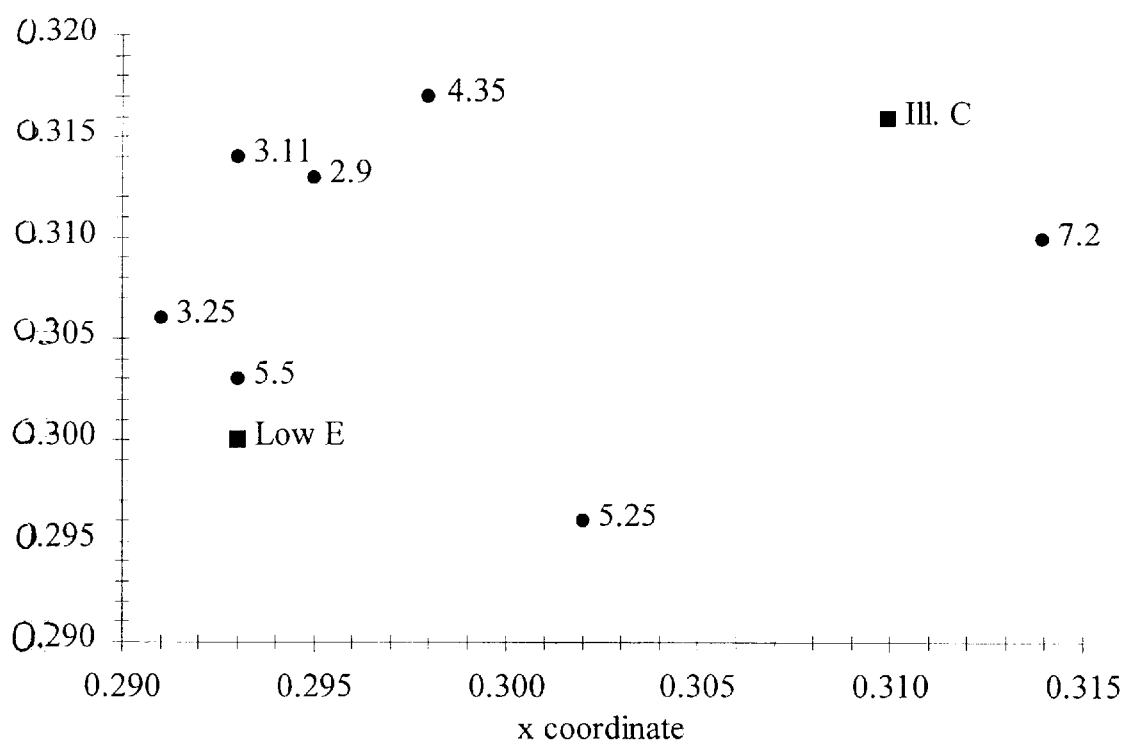
FIGURE 18. Reflected color coordinate variation as a function of Sb precursor concentration. Film thickness for TOSb and TOF layers held constant at 240 and 300 nm, respectively.

Figure 19: Reflected color coordinate variation as a function of TOSb/TOF film thickness. One layer varied at a time. SbCl$_3$ precursor concentration fixed at 5.5 %.
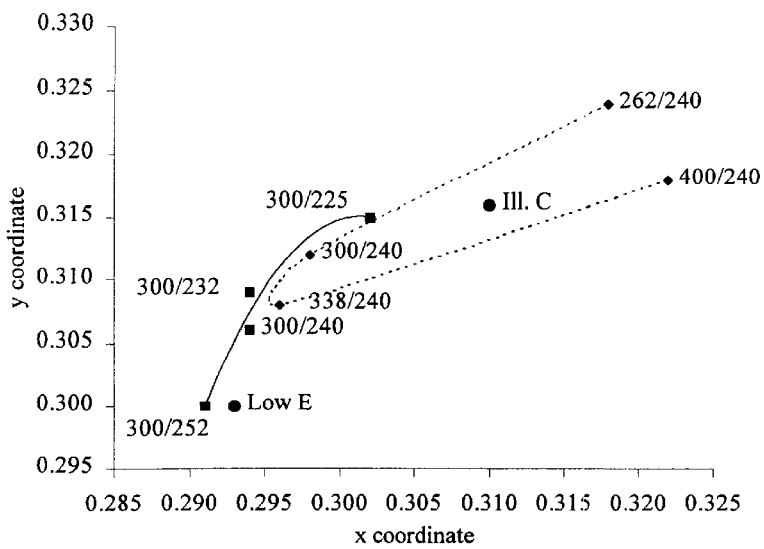

SOLAR CONTROL COATED GLASS

REFERENCE TO RELATED APPLICATION

The present application is a continuation-in-part of U.S. patent application Ser. No. 09/249,761 filed Feb. 16, 1999 now U.S. Pat. No. 6,218,018 which is incorporated herein by reference and claims the benefit of provisional application No. 60/097,523 filed Aug. 21, 1998.

BACKGROUND OF INVENTION

This invention relates to coated glass used in residential, architectural and vehicle windows and miscellaneous applications where both solar control and low emissivity properties are desired. The coatings for solar control and low emissivity contain tin oxide having various dopants. The invention avoids the need for an anti-iridescence underlayer. The glass articles may be of any shape but are typically flat or curved. The glass composition can very widely but is typically soda lime glass produced by the float process. It may be annealed, heat strengthened or tempered.

DESCRIPTION OF PRIOR ART

Solar-control is a term describing the property of regulating the amount of solar heat energy which is allowed to pass through a glass article into an enclosed space such as a building or an automobile interior. Low emissivity is a term describing the property of an article's surface wherein the absorption and emission of mid-range infrared radiation is suppressed, making the surface a mid-range infrared reflector and thereby reducing heat flux through the article by attenuating the radiative component of heat transfer to and from the low emissivity surface (sometimes referred to as Low E). By suppressing solar heat gain, building and automobile interiors are kept cooler; allowing a reduction in air conditioning requirements and costs. Efficient low emissivity coatings improve comfort during both summer and winter by increasing the thermal insulating performance of a window.

Important to commercially acceptable coated glass articles which possess both solar-control and low emissivity properties are, of course, economic processes for producing the articles and durability and maintenance of associated properties such as light transmission, visibility, color, clarity and reflection.

As explained below, various technologies have been employed to meet the requirement for solar-control and low emissivity glass, however, no one system has successfully met all of the performance requirements in an economic manner.

Many coatings and coating systems cause iridescent colors to develop in the coated article. This may be caused by the chemical composition of the coating, the thickness of an individual layer or layers, or an interaction of the substrate and coatings to incident light. Such iridescence can, in some cases, be minimized or eliminated by placing an anti-iridescence layer between the glass substrate and the first coating. The use of an interference layer between the glass and a subsequent functional layer or layers to suppress iridescence or color reflection was first demonstrated by Roy G. Gordon, and was the subject of U.S. Pat. No. 4,187,336, issued Feb. 5, 1980. The Gordon technology has been the state of the art for coated solar control glass as evidenced by recently issued U.S. Pat. No. 5,780,149 (McCurdy el al, Jul. 14, 1998) which applied two layers to obtain solar control on top of a Gordon type interference layer. The interference layer frequently contains silicon dioxide. Surprisingly, the present invention represents a dramatic breakthrough and eliminates the need for a Gordon type underlayer to control reflected color.

U.S. Pat. No. 3,149,989 discloses compositions of coatings useful in producing radiation reflecting (solar-control) glass. At least two coatings are used with the first coating, adhered to the glass substrate, being comprised of tin oxide doped with a relatively high level of antimony. The second coating is also comprised of tin oxide and is doped with a relatively low level of antimony. The two films may be superimposed, one on another, or may be applied to opposite sides of the glass substrate. In either case, these solar-control coatings do not contribute significant low emissivity properties to the glass article.

U.S. Pat. No. 4,286,009 teaches a heat absorbing glass designed to convert incident sun rays into heat energy that is transferred to a working fluid for heat transfer. Accordingly, the coated glass absorbs at least 85% of the solar wavelength range rays and has a relatively low emissivity characteristic of less than 0.2. The coatings are positioned on the outside of the glass (i.e. the side facing the sun) and the fluid for heat transfer contacts the inside surface of the glass. The coatings comprise a first coating of metal oxides deposited on the smooth glass layer which oxides are selected from tin, antimony, indium, and iron and a second coating of metal oxides deposited on the first coating selected from the same group of metals. The films as designed will have very low visible transmissions and no teaching on the control of reflected color is given.

U.S. Pat. No. 4,601,917 teaches liquid coating compositions for producing high-quality, high-performance, fluorine-doped tin oxide coatings by chemical vapor deposition. One of the uses of such coatings is in the production of energy-efficient windows, also known in the trade as low-E or low-E windows. Methods of producing the coated glass are also described. This patent does not teach how to produce coated glass articles which possess both solar-control and low emissivity properties.

U.S. Pat. No. 4,504,109, assigned to Kabushiki Kaisha Toyota Chou, describes glass coated with infrared shielding multilayers comprising a visible light transparent substrate and an overlying component lamination consisting of "at least one infrared shield layer and at least one interferential reflection layer alternatively lying on each other . . . " Indium oxide doped with Sn is used in the examples as the infrared shield layer and $TiO_2$ was used as the interferential shield layer. In order to reduce iridescence the infrared shield layer and the interferential reflection layer thickness must have a value of one quarter lambda (lambda/4) with a permissible deviation of from 75% to 130% of lambda/4. Although other formulations are disclosed for the infrared shield layer and the interferential reflection layer such as $SnO_2$ with or without dopants, (see column 6 lines 12 to 27), however, the specific combination of doped $SnO_2$ layers of the present invention that accomplishes solar control, low emissivity and anti-iridescence without requiring a lambda/4 thickness limitation is neither disclosed nor exemplified to suppress iridescence or color reflection.

U.S. Pat. No. 4,583,815, also assigned to Kabushiki Kaisha Toyota Chou describes a heat wave shield laminate consisting of two indium tin oxide overlayers containing different amounts of tin. Antireflection layers, above or below the indium tin oxide layers are also described. Other formulations are disclosed for the infrared shield layer and the interferential reflection layer such as $SnO_2$ with a dopant that becomes a positive ion with a valence of +5 such as Sb, P, As, Nb, Ta, W, or Mo or an element such as F which readily becomes a negative ion with a valence of −1, (see column 22 lines 17 to 23). However, the specific combination of doped $SnO_2$ layers of the present invention that accomplishes solar shielding, low emissivity and anti-iridescence is neither disclosed nor exemplified. There is no claim to tin oxide layers nor any teaching in the specification to describe the composition of such layers, e.g. the ratio of dopant to tin oxide. It should also be noted that the teaching leads to the use of the same dopant in both layers (indium tin oxide) whereas in the instant patent application, one layer must contain a different dopant than the other layer.

U.S. Pat. No. 4,828,880, assigned to Pilkington PLC, describes barrier layers which act to inhibit migration of alkali metal ions from a glass surface and/or act as color suppressing underlayers for overlying infrared reflecting or electrically conducting layers. Some of these color suppressing layers are used in solar-control or low emissivity glass construction.

U.S. Pat. No. 4,900,634 assigned to Glaverbel discloses a pyrolytic coating of tin oxide containing a mixture of fluorine and antimony dopants coated on glass and imparting low emissivity and a specific haze reduction factor of at most 1.5.

U.S. Pat. No. 5,168,003, assigned to Ford Motor Company, describes a glazing article bearing a substantially transparent coating comprising an optically functional layer (which may be low emissivity or solar control) and a thinner anti-iridescence layer which is a multiple gradient step zone layer. Antimony doped tin oxide is mentioned as a possible alternative or optional component of the exemplified low emissivity layer.

U.S. Pat. No. 5,780,149, assigned to Libbey-Owens-Ford describes solar control coated glass wherein at least three coating layers are present, first and second transparent coatings and an iridescence suppressing layer lying between the glass substrate and the transparent upper layers. The invention relies upon the transparent layers having a difference in refractive indices in the near infrared region greater than the difference of indices in the visible region. This difference causes solar heat to be reflected in the near IR region as opposed to being absorbed. Doped metal oxides which have low emissivity properties, such as fluorine doped tin oxide, are used as the first transparent layer. Metal oxides such as undoped tin oxide are used as the second layer. No NIR absorbing combinations are described.

EP 0-546-302-B1 issued Jul. 16, 1997 and is assigned to Asahi Glass Co. This patent describes coating systems for solar-control, heat treated (tempered or bent) glass comprising a protection layer based on a metal nitride. The protection layer or layers are used to overcoat the solar-control layer (to prevent it from oxidizing during thermal treatment). As a solar control layer, many examples are provided including tin oxide doped with antimony or fluorine. However, the specific combination of doped $SnO_2$ layers of the present invention that accomplishes solar control, low emissivity and anti-iridescence without following Gordon's teachings is neither disclosed nor exemplified.

EP 0-735-009-A1 is a patent application that was published in February 1996 and is assigned to Central Glass Co. This patent application describes a heat-reflecting glass pane having a multilayer coating comprising a glass plate and two layers. The first layer is a high refractive index metal oxide based on Cr, Mn, Fe, Co, Ni or Cu, the second layer is a lower refractive index film based on a metal oxide such as tin oxide. Doped layers and low emissivity or NIR absorbing combinations are not disclosed.

WO 98/11031 This patent application was published in March 1998 and assigned to Pilkington PLC. It describes a high performance solar-control glass comprising a glass substrate with coatings comprising a heat-absorbing layer and a low emissivity layer of a metal oxide. The heat-absorbing layer may be a metal oxide layer. This layer may be doped tungsten, cobalt, chromium, iron molybdenum, niobium or vanadium oxide or mixtures thereof. The low emissivity layer may be doped tin oxide. In a preferred aspect of the invention, an iridescence-suppressing layer or layers is incorporated under the coating comprising a heat-absorbing layer and a low emissivity layer. This application does not disclose or suggest the specific combination of doped $SnO_2$ layers of the present invention that accomplishes solar control, low emissivity and anti-iridescence without requiring a "Gordon" type underlayer to suppress iridescence or color reflection.

Canadian Patent 2,193,158 discloses an antimony doped tin oxide layer on glass with a tin to antimony molar ratio o 1:0.2 to 1:0.5 that reduces the light transmission of the glass.

*Dopant Effects in Sprayed Tin Oxide Films,* by E. Shanthi, A. Banerjee and K. L. Chopra, Thin Solid Films, Vol 88, 1981 pages 93 to 100 discusses the effects of antimony, fluorine, and antimony-fluorine dopants on the electrical properties of tin oxide films. The article does not disclose any optical properties of the antimony-fluorine films nor the effect on transmitted or reflected color.

UK Patent Application GB 2,302,101 A assigned to Glaverbel describes a glass article coated with an antimony/tin oxide film of at least 400 nm containing an Sb/Sn molar ratio from 0.05 to 0.5, with a visible transmittance of less than 35%. The films are applied by aqueous spray CVD and are intended for privacy glass applications. Haze reducing undercoats are taught as well as thick layers with low Sb/Sn ratios which have low emissivity properties as well as high solar absorbency. It also teaches that it is possible to provide one or more additional coating layers to achieve certain desirable optical properties. None of these properties other than haze are mentioned. The application teaches nothing about thinner layers, the use of more than one dopant, or the control of film color.

UK Patent Application GB 2,302,102 A also assigned to Glaverbel describes a glass substrate coated with a Sn/Sb oxide layer containing tin and antimony in a molar ratio of from 0.01 to 0.5, said layer having been deposited by CVD, whereby the coated substrate has a solar factor(solar heat gain coefficient) of less than 0.7. The coatings are intended for window applications and have luminous transmittances between 40 and 65% and thicknesses ranging from 100 to 500 nm. Haze reducing undercoats are claimed and low emissivity can be imparted to the coatings by a judicious choice of the Sb/Sn ratio. Like the previous application, the teaching of providing one or more additional coating layers to achieve certain desirable optical properties is mentioned. Also low emissivity layers of fluorine doped tin oxide can be deposited over the Sb/Sn layers or fluorine components can be added to the Sb/Sn reactants to give low emissivity films which contain F, Sb and Sn. The last two methods were not favored because of the added time and cost of adding a third layer and the fact that the emissivity of the Sb/F films was raised and not lowered. No mention of color control or color neutrality is found.

GB 2,200139, assigned to Glaverbel teaches a method of depositing a coating by the spray application of solutions containing tin precursors, fluorine containing compounds and at least one other dopant selected from the group antimony, arsenic, vanadium, cobalt, zinc, cadmium, tungsten, tellurium or manganese.

Previously, glass manufacturers have managed heat transport through windows by the use of absorbing and/or reflecting coatings, glass tints, and post-applied films. Most of these coatings and films are designed to control only one portion of the solar heat spectrum, either the NIR, i.e. near infra red component of the electromagnetic spectrum having a wavelength in the range of 750–2500 nm or the mid IR component of the electromagnetic spectrum having a wavelength on the range of 2.5–25 microns. A product has been designed to control the entire heat spectrum, however Sputtered metal/dielectric film stacks while effective, have limited durability and must be protected and sealed within the center section of a multipane insulated glass unit (IGU). What is needed is a total solar control film or combination of films that can be easily applied by pyrolytic deposition during the glass making operation which yields an article which has an acceptable visible transmission, reflects or absorbs the NIR, reflects the mid-IR, and is neutral or close to neutral in color.

The above references either alone or in combination do not teach or suggest the specific combination of doped $SnO_2$ layers of the present invention that accomplishes solar control, low emissivity and anti-iridescence without requiring a "Gordon" type underlayer.

SUMMARY OF THE INVENTION

The present invention provides an improved solar-control glass that has acceptable visible light transmission, absorbs near infrared wavelength light (NIR) and reflects midrange infrared light (low emissivity or Low E) along with a preselected color within the visible spectrum for reflected light that can be controlled to a specific color or be made essentially colorless ("neutral" as defined hereinafter). Also provided is a method of producing the improved, coated, solar-control glass. The improved glass coating is a tin oxide coating with various dopants and haze modifiers in specific layers of the coating. One layer is a solar energy (NIR) absorbing layer comprising tin oxide having a dopant such as antimony. Another layer in the tin oxide coating is a low emissivity control layer capable of reflecting midrange infrared light and comprising tin oxide having fluorine and/or phosphorus dopant. A separate iridescence color suppressing layer as described in the prior art such as a "Gordon" layer is generally not needed to achieve a neutral (colorless) appearance for light reflected off the coated glass, however an iridescence suppressing layer or other layers may be combined with the multilayer tin oxide coating provided by the present invention. If desired, multiple solar control and/or multiple low emissivity layers can be utilized. The NIR layer and the low emissivity layer are separate portions of a single tin oxide film since both layers are composed of doped tin oxide. A method of producing the coated solar control glass is also provided. In addition, the present invention controls or changes the color of transmitted light through the addition of color additives to the NIR layer. Surprisingly the dopant fluorine that produces a noncolored tin oxide film functions as a color additive when added as an additional dopant to the NIR layer and modifies the color of transmitted light through the NIR film. Also provided are haze reducing dopants in specific layers of the tin oxide coating.

BRIEF DESCRIPTION OF THE DRAWINGS

FIG. 15 shows haze reduction values for tin oxide coatings of the present invention with and without haze reducing additives in the NIR layer, 28. FIGS. 16, 17, 18 and 19 graphically depict data developed in the examples.

OBJECTS OF THE INVENTION

Figure 1:
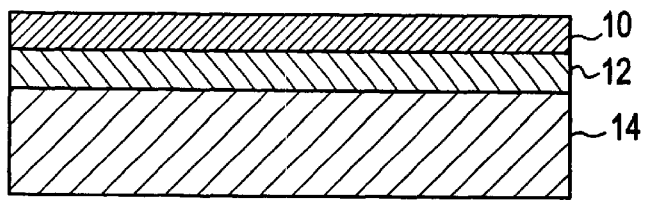
FIGS. 1 through 4 and 8 through 15 depict a cross-section of coated glass having different numbers of layers or films in different stacking sequences for the tin oxide layer on a glass substrate.

An object of the invention is to prepare a transparent article with controlled reflected color (even neutral color as defined herein,) that will absorb solar near infrared (NIR) wavelength radiation and reflect mid-range infrared heat (low emissivity) comprising glass having a tin oxide coating composed of two thin film layers containing doped $SnO_2$ with haze reducing additives or dopants in at least one of the layers. Another object is the application of the layers by atmospheric pressure chemical vapor deposition (CVD) techniques, or by other processes such as solution spray or vaporized/sublimed liquids/solids can be utilized. The preferred method of application for this invention is atmospheric pressure CVD using vaporized liquid precursors. Another object is to provide multiple solar control and/or low emissivity layers along with other layers in combination with the solar control or low emissivity layer. Another object is to provide a solar control film or combination of films that can be easily applied by pyrolytic deposition during the glass making operation which yields an article which has an acceptable visible transmission, reflects or absorbs the NIR, reflects the mid-IR (low-E), and is neutral or close to neutral in color, the production of which is an object of the present invention. Another object of the invention is to control the color of transmitted light independently from the color of reflected light by the addition of color additives in the NIR layer.

DETAILED DESCRIPTION OF INVENTION AND PREFERRED EMBODIMENTS

Solar control and low emissivity coated glass is produced by depositing on a heated transparent substrate at least two layers, a low emissivity layer comprising a $SnO_2$ film containing fluorine and/or phosphorus dopant and a NIR absorbing layer comprising a $SnO_2$ film containing as a dopant antimony, tungsten, vanadium, iron, chromium, molybdenum, niobium, cobalt, nickel or mixtures thereof. This combination has been found to effectively control the solar and radiative heat portions of the electromagnetic spectrum such that a window coated with these films will have greatly enhanced properties.

Solar control properties are typically expressed in terms of solar heat gain coefficient (SHGC) and U-value. SHGC is a measure of the total solar heat gain through a window system relative to the incident solar radiation, while the U-value (U) is the total heat transfer coefficient for the window. The SHGC of the coated glass is primarily dependent on the thickness and the antimony content of the NIR absorbing film (see FIGS. 5 and 6) while the U-value depends primarily on the film's emissivity and the window construction. SHGC measured at center of glass can range from about 0.40 to 0.80 while U values measured at center of glass can vary from about 0.7–1.2 for a single pane coated with the preferred embodiment films. In an insulated glass unit (IGU) the SHGC's decrease to ~0.30 with U-values as low as ~0.28.

Both the reflected and transmitted color of the coated glass of the present invention can be controlled. In addition the amount of visible light transmitted through the coated glass can be controlled between about 25–80% by controlling the thickness of the NIR and low emmisivity films and the concentration of dopant in the NIR film. Transmitted color, i.e. the color of light transmitted through the coated glass can be controlled separately from the reflected color by the addition of a color-effective quantity of a color additive to the NIR layer of the coating. The reflected color can vary from almost neutral to red, yellow, blue or green and can be controlled by varying the film thickness and dopant content of the layers. Surprisingly, color neutrality as defined herein can be achieved for reflected color without the need of an anti-iridescent layer. Although the refractive indices of the NIR and low emmisivity films are different, the reflected color does not depend on classical interference phenomena originally discovered by Gordon (U.S. Pat. No. 4,1887,336). Observed reflected color is unexpectedly controlled by the combination of absorption and reflection achieved by the NIR layer (absorption) and the reflection achieved by the low-emmisivity layer or layers. The absorption of the NIR layer can be controlled by varying the thickness of its $SnO_2$ layer and the concentration of the dopant in the NIR layer, usually antimony. The reflectance of the low emissivity layer can be controlled by varying the thickness of its $SnO_2$ layer and the concentration of the dopant in the low emissivity layer, usually fluorine. The low emissivity layer composed of $SnO_2$ containing a fluorine or phosphorous dopant is sometimes abbreviated herein as TOF or TOP while the NIR layer of $SnO_2$ when it contains an antimony dopant is sometimes abbreviated herein as TOSb.

Figure 3:
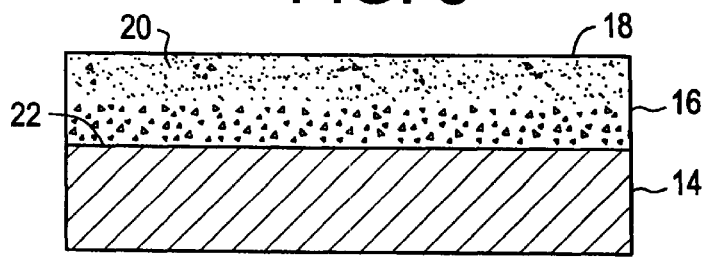
Figure 8:
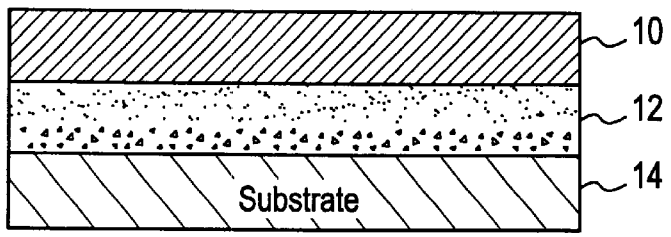
Figure 9:
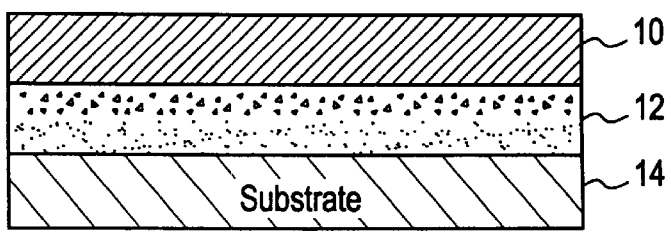
Figure 10:
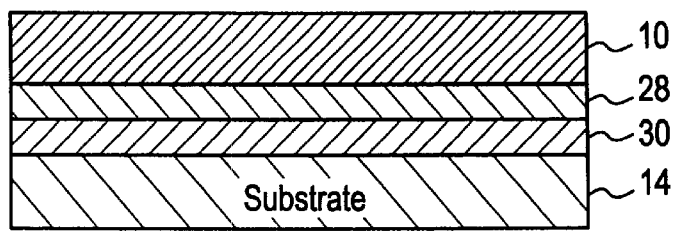
Figure 11:
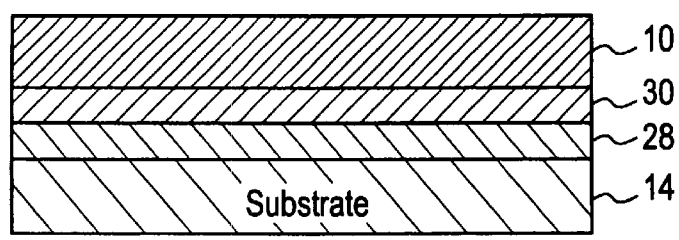
Figure 12:
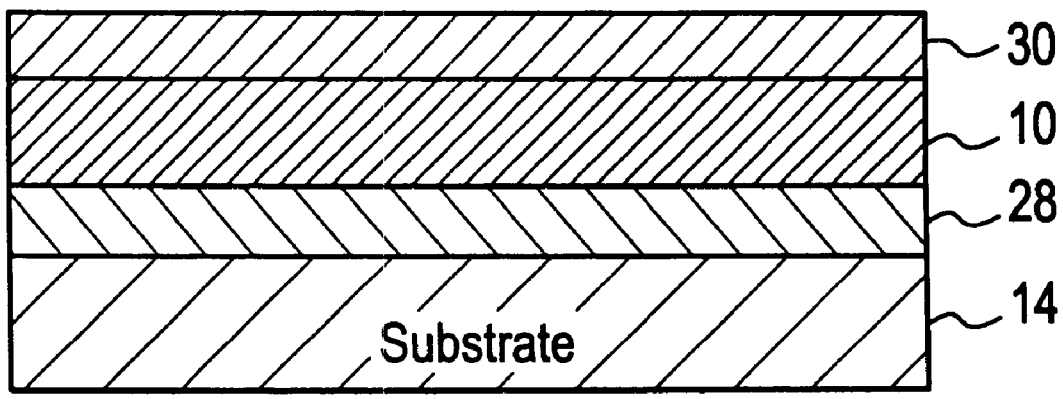
Figure 13:
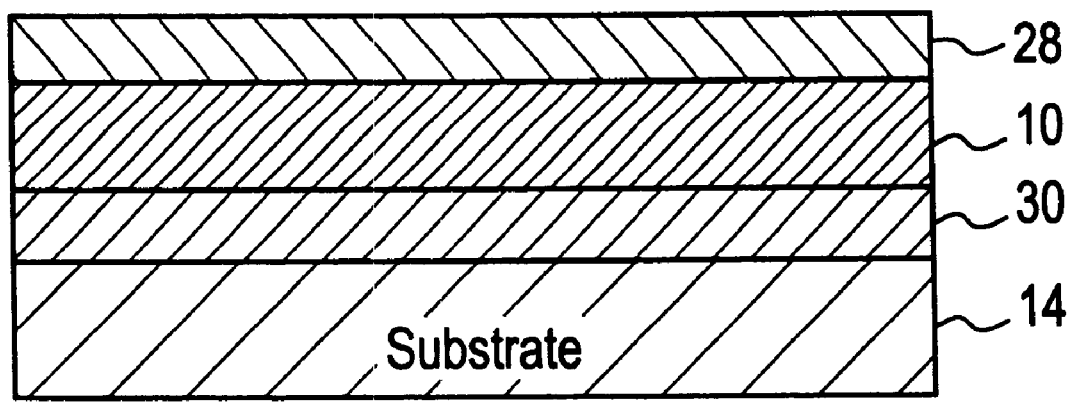

The preferred embodiment of this invention utilizes a tin oxide coating that has a fluorine doped tin oxide (TOF) layer as the low emmisivity layer with an antimony doped tin oxide (TOSb) layer as the NIR layer and with a haze reducing additive in at least one of the layers preferable in the layer deposited directly onto the glass. TOF films and their deposition processes onto glass are known in the art and referred to as low emissivity films. The NIR absorbing film is also a $SnO_2$ film but contains a different dopant than the low emissivity layer. The dopant in the NIR layer is preferably antimony although the dopant can be an element selected from the group consisting of antimony, tungsten vanadium, iron, chromium, molybdenum, niobium, cobalt, nickel, and mixtures thereof. A mixture of one or more dopants can be used in the NIR layer, however the low emissivity layer must contain a low emissivity dopant that imparts significant conductivity to the layer such as fluorine or phosphorous, although other dopants may be used in combination with the low emissivity dopant. Since the low emissivity and the NIR layers of the present invention both utilize $SnO_2$ as the metal oxide matrix containing a dopant, the NIR and the low emissivity layers are preferably part of a single film having a dopant gradient or layers having different dopants. A single film utilizing a dopant gradient is depicted in FIG. 3 as film 16. In film 16 there is a dopant gradient with the NIR dopant having a higher concentration than the other dopant(s) at one surface of the film, either surface 18 or 22, and the low emissivity dopant having a higher concentration than the other dopants at the other surface of the film. This results in a change or gradient in the concentrations of the NIR and low emissivity dopants between surface 18 and surface 22. At some intermediate point 20 between surface 18 and surface 22 the concentration of the NIR dopant changes from being the highest concentration dopant on one side of point 22 to no longer being the highest concentration dopant on the other side of point 22. FIG. 8 shows the low e film, 10, above the NIR film 12, The NIR film 12 in FIG. 8 has a concentration gradient for the NIR dopant in the tin oxide film with a lower concentration of the dopant closer to the low e film 10. The coated glass of FIG. 9 is similar to the structure shown in FIG. 8 with the exception that the concentration gradient of the NIR dopant, usually antimony, is higher near the low e film 10 and lower nearer the substrate. Film 12 is different then film 16 shown in FIG. 3 in that film 12 is a NIR film while film 16 has both NIR and low e properties and contains both a low e dopant and a NIR dopant with a concentration gradient for the low e dopant and a concentration gradient for the NIR dopant. FIGS. 10, 11, 12 and 13 show the NIR layer as two distinct films, 28 and 30. Film 28 is shown as being thicker than film 30 and the total thickness of the NIR layer is the sum of the thicknesses of films 28 and 30 and should be within the range of thicknesses stated above for the NIR layer and preferably from 80 to 300 nm. In FIGS. 10 and 11, films 28 and 30 are adjacent each other, while in FIGS. 12 and 13, films 28 and 30 are on opposite sides of low e film 10. The concentration of dopant in film 28 is preferably different than the concentration of dopant in film 30.

Figure 14:
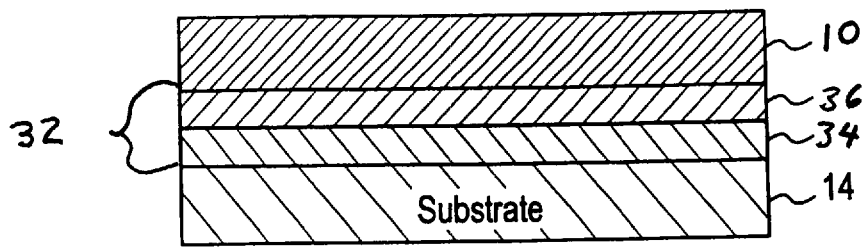

FIG. 14 shows a bilayer tin oxide film deposited directly on a glass substrate 14 with the lower layer 32 being one section, 34 having a haze reducing additive and and other portion, 36 without an haze reducing additive, while the top layer, 10 is a low emissivity layer such as fluorine doped tin oxide.

Figure 15:
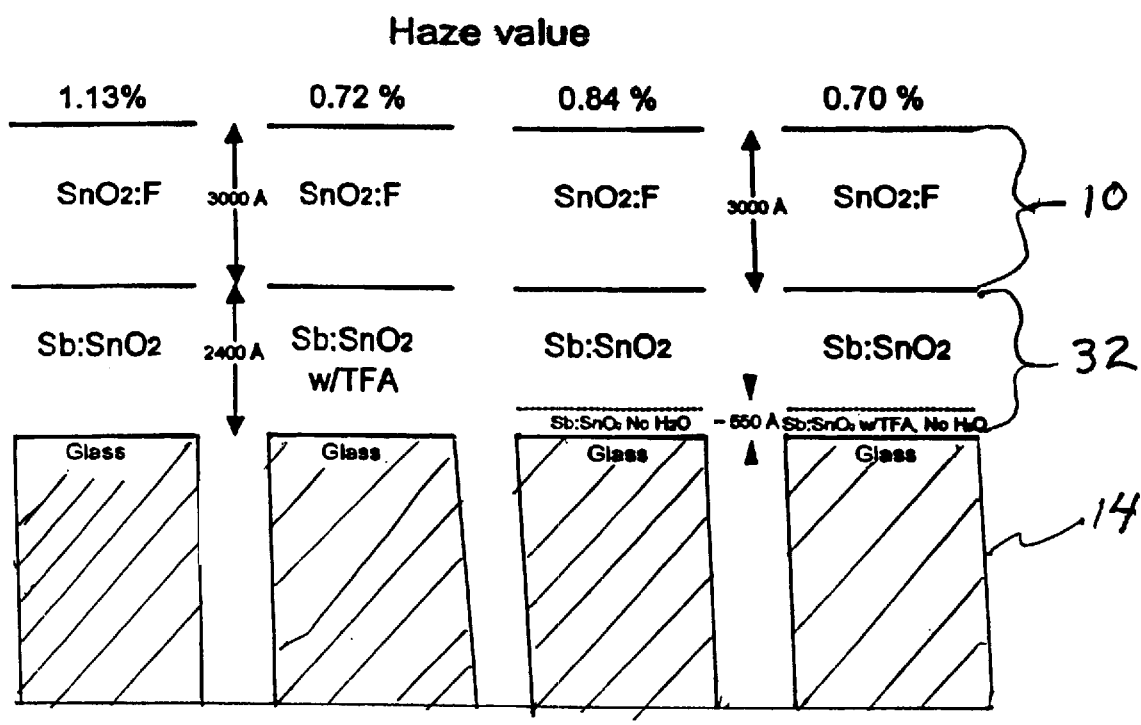
Figure 16:
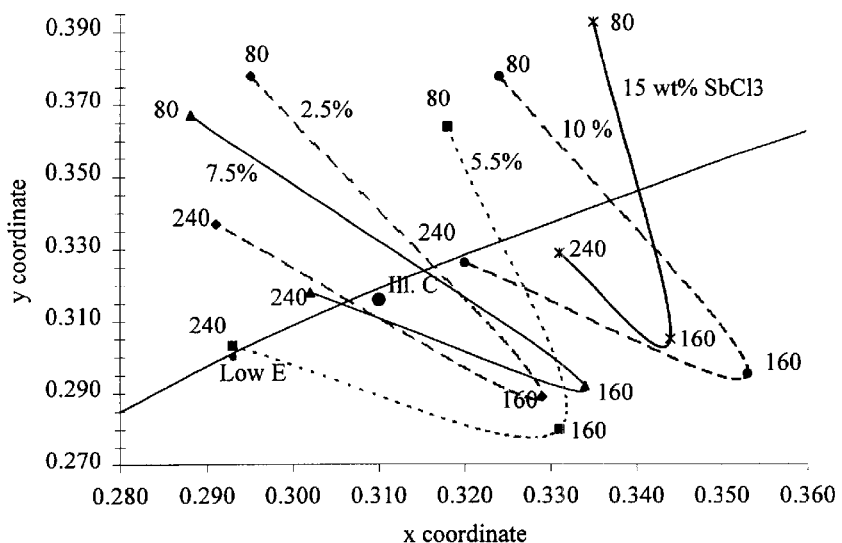
Figure 17:
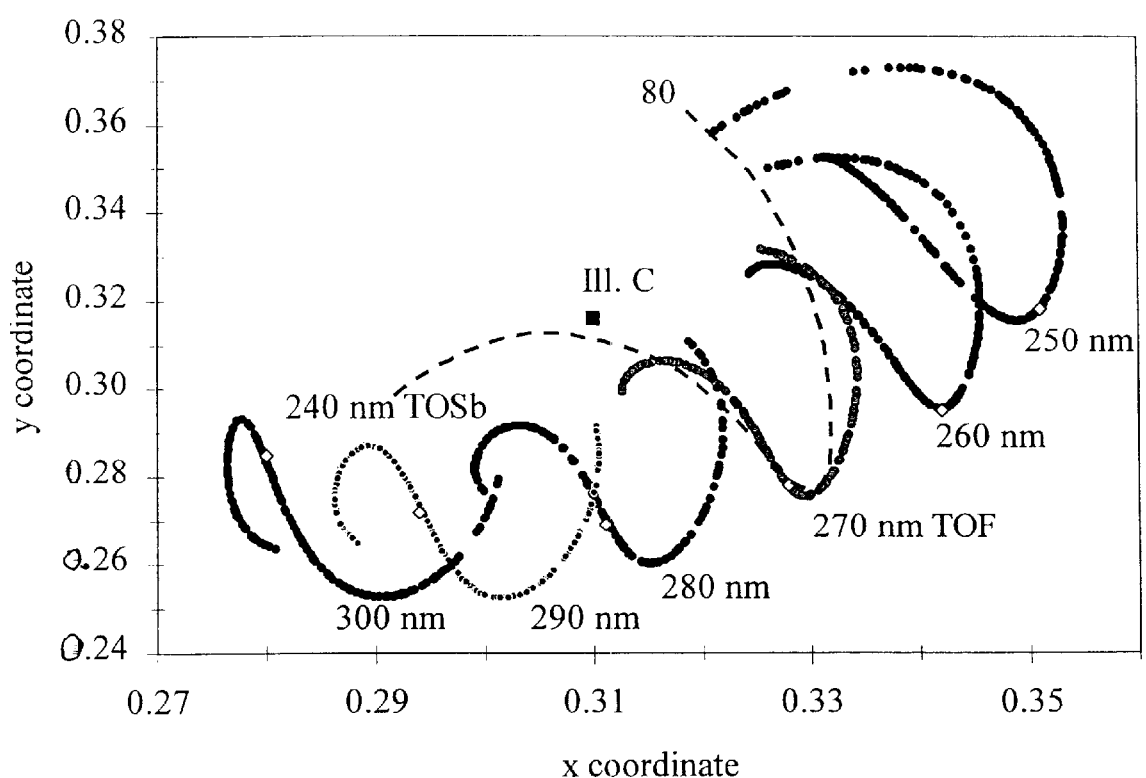

FIG. 15 shows haze reduction values for tin oxide coatings of the present invention with and without haze reducing additives in the NIR layer, 32. Shown are four glass substrates each having an antimony doped tin oxide NIR layer, 32, about 2400 angstroms thick beneath a fluorine doped low e layer, 10 each about 3000 angstroms thick. In the coated glass on the left, haze was 1.13% verses 0.72% when TFA was added to the NIR layer shown on the second from the left. Continuing to the right in FIG. 15, the haze of the bilayer coating 32 and 10, is 0.84 when water was withheld during the deposition of the first 550 (approximately) angstroms of the NIR layer, verses a haze of 0.70 shown in the far right bilayer coated glass in which the TFA but no water was present among the precursors that deposited the first 550 angstroms of NIR layer 32.

The preferred embodiment of this invention uses an antimony doped film as the NIR film. Such a film can be deposited by a number of techniques including spray pyrolysis, PVD and CVD methods. Spray pyrolysis is known and disclosed in patents such as Canadian patent 2,193,158. CVD methods for depositing $SnO_2$ films with or without dopants and the chemical precursors for forming $SnO_2$ films containing dopants are well known and disclosed in U.S. Pat. Nos. 4,601,917, and 4,285,974. Preferred is CVD deposition of the $SnO_2$ layers containing dopants according to known methods directly on a float glass manufacturing line outside of or within the float glass chamber utilizing conventional on-line deposition techniques and chemical precursors as taught by U.S. Pat. No. 4,853,257 (Henery). However the $SnO_2$ films containing dopants can be applied as layers on glass utilizing other processes such as solution spray or vaporized/sublimed liquids/solids at atmospheric pressure. When the application is by solution spray the same $SnO_2$ precursors and dopants are dissolved in a suitable non-reactive solvent and applied by known spray techniques to the hot glass ribbon at atmospheric pressure. Suitable solvents for the solution spray application as taught in Canadian Patent Application 2,193,158 include alcohols such as ethanol and isopropanol, ketones such as acetone and 2-butanone, and esters such as ethyl acetate and butyl acetate. The preferred method of application for this invention is atmospheric pressure CVD using vaporized liquid precursors. The process is very amenable to existing commercial on-line deposition systems. The precursors of the preferred embodiments are economical to apply, will enable long coating times, will reduce the frequency of system clean-out, and should be able to be used with little or no modification to existing glass float line coating equipment.

The coatings function by a combination of reflection and absorption. The low emissivity film reflects mid-IR heat in the 2.5–25 micron region of the spectrum while the NIR absorbing film absorbs heat primarily in the 750–2500 nm region. While not to be bound thereby, the theory upon which we account for this effect is that in the NIR region, the plasma wavelength (PL—the wavelength where the low emissivity film changes from a transmitter to a reflector of light energy) for the low emissivity film falls in the NIR region. In the area around the PL, the NIR absorption is the highest for the low emissivity film and when combined with a NIR absorbing film, increased absorbency takes place. The NIR absorbing films of our preferred embodiments are also doped semi-conductors and hence have reflective properties in the mid IR. This reflection coupled with the low emissivity film reflection gives an overall higher heat reflectance in the mid IR.

Preferably the $SnO_2$ is pyrolyticly deposited on the glass using a tin precursor, especially an organotin precursor compound such as monobutyltin trichloride (MBTC), dimethyltin dichloride, dibutyltin diacetate, methyl tin trichloride or any of the known precursors for CVD deposition of $SnO_2$ such as those disclosed in U.S. Pat. No. 4,601,917 incorporated herein by reference. Often such organotin compounds used as precursors for pyrolytic deposition of $SnO_2$ contain stabilizers such as ethanol. Preferably the concentration of stabilizers is less than 1% in order to reduce fire risks when contacting hot glass with such chemicals in the presence of oxygen. Precursors for the dopant in the NIR layer (antimony, tungsten, vanadium, iron, chromium, molybdenum, niobium, cobalt and nickel) are preferably halides such as antimony trichloride, however alkoxides, esters, acetylacetonates and carbonyls can be used as well. Other suitable precursors for the dopant and $SnO_2$ are well known to those skilled in the art. Suitable precursors and quantities for the fluorine dopant in the low emissivity $SnO_2$ layer are disclosed in U.S. Pat. No. 4,601,917 and include trifluoroacetic acid, ethyltrifluoroacetate, ammonium fluoride, and hydrofluoric acid. Concentration of low emissivity dopant is usually less then 30% with preferred concentrations of low emissivity dopant from 1% to 15% by weight of dopant precursor based upon the combined weight of dopant precursor and tin precursor. This generally correlates to a dopant concentration in the low e film of from 1% to 5% percent based upon the weight of tin oxide in the low e film.

In our preferred embodiments, the properties depend on the thickness of the low emissivity and absorbing layers as well as the antimony content of the absorbing (NIR) film. The low emissivity film thickness can range from 200–450 nm with to 320 nm being most preferred. The preferred NIR absorbing films can be deposited in a similar fashion as the low emissivity films using such methods as disclosed in U.S. Pat. No. 4,601,917. The organotin precursors for the $SnO_2$ can be vaporized in air or other suitable carrier gases containing a source of $O_2$ and in precursor concentrations from 0.25–4.0 mol % (0.5–3.0 mol % more preferred). $SnO_2$ precursor concentrations are expressed herein as a percentage based upon the moles of precursor and the moles of carrier gas. Preferred concentrations of NIR dopant precursor are from about 1% to about 20% (2.5% to 7.5% more preferred and 3.0% to 6.0% most preferred) and are calculated using the weight of dopant precursor and the weight of $SnO_2$ precursor. Particularly preferred is an antimony dopant using antimony trichloride as the precursor at about 2% to about 8% by weight with about 4.0% by weight particularly preferred. This correlates to a similar antimony mass percent in the tin oxide NIR film.

Figure 2:
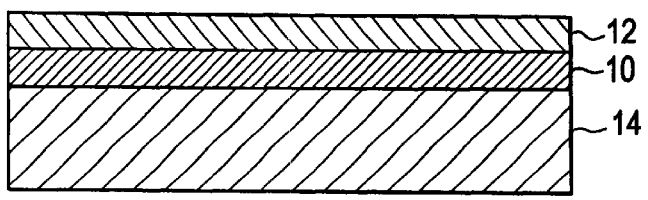
Figure 4:
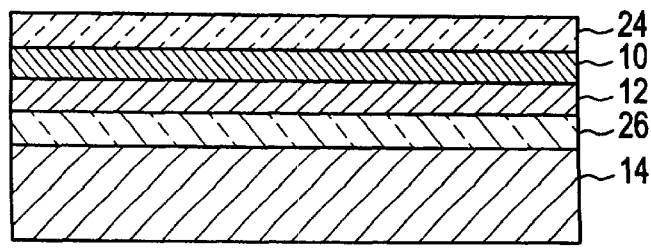
Figure 7:
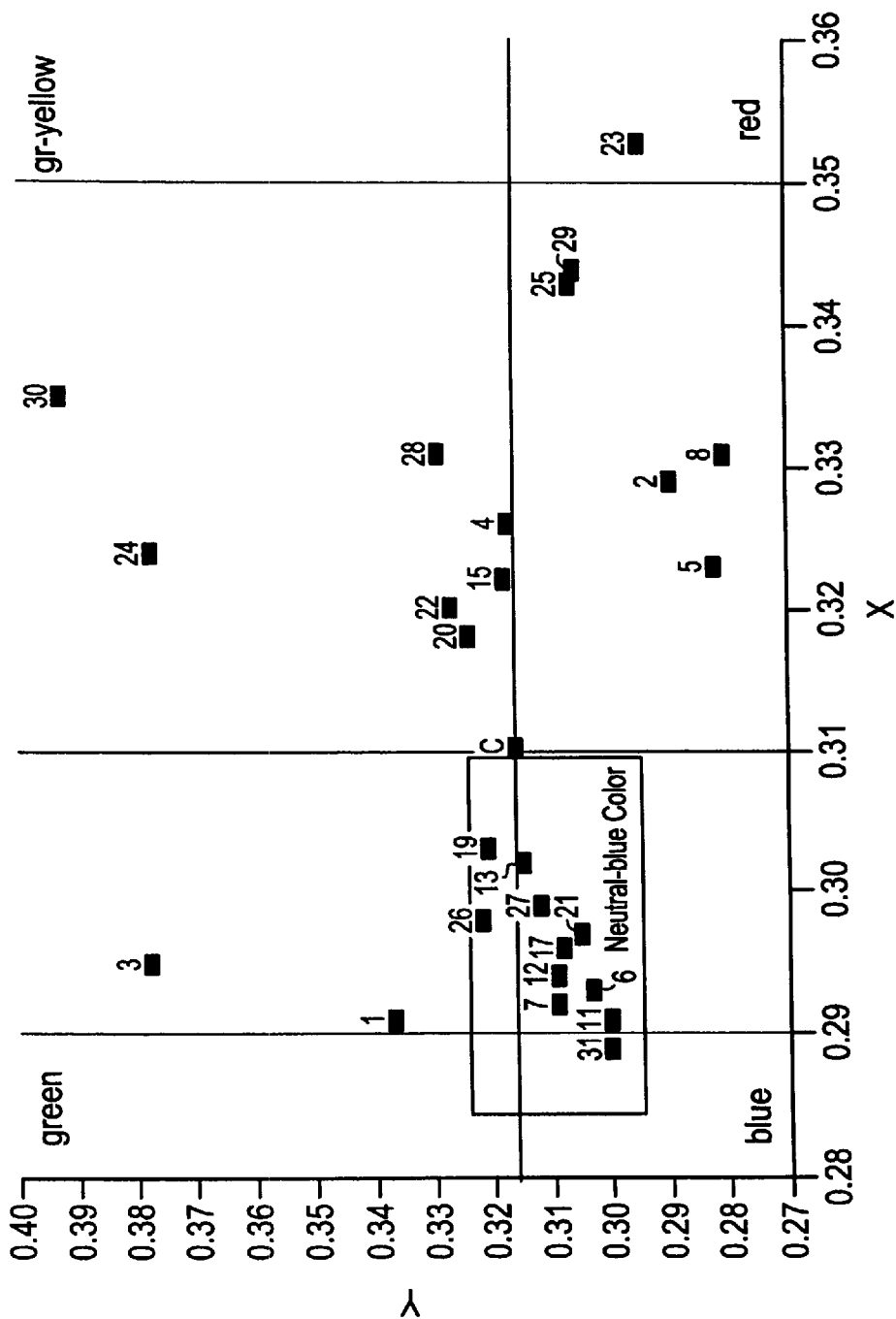
FIG. 7 depicts the color spectrum in terms of Commission Internationale de L'Exclairage (C.I.E.) x and y coordinates and the specific color achievable with various film thickness and dopant concentrations. The English translation for C.I.E. is International Commission on Illumination

The coated glass of the present invention is depicted in the figures. FIG. 1 shows the films in cross section. The film thicknesses can range from 200 to 450 nm for the low emissivity film (item 10) and for the NIR film (item 12) from 80 to 300 nm. The preferred thickness is 250 to 350 nm for the low emmisivity film and 200 to 280 nm for the NIR film. Most preferred is 280 to 320 nm for the low e film and 220–260 nm for NIR film. Using films of the preferred embodiments, solar control coated glass can be produced with a Neutral-blue Color which is defined herein as coated glass having reflected light predominately within C.I.E. chromaticity coordinates values of x between 0.285 and 0.310 and y between 0.295 and 0.325. The definition of Neutral-blue is shown in FIG. 7 by the area within the box labeled Neutral-blue Color. As shown in FIG. 7, with examples 15, 20 and 22, controlled or preselected reflected color close to neutral color but slightly to the yellow side of neutral can be produced (x values of up to 0.325 and y values of up to 0.33), but such essentially neutral to slightly yellow shades of reflected color are not appealing to consumers. FIG. 2 shows the two films or layers in the opposite sequence than that shown in FIG. 1. In FIG. 2, the low emissivity film is closer to the glass 14 than the NIR film 12. FIG. 3 shows the NIR and the low emissivity layers integrated into a single $SnO_2$ film 16 having a dopant gradient within film 16. Film 16 has a preponderance of one dopant (e.g. the low emissivity dopant, fluorine) at the upper surface, 18, away from the glass 14 and a preponderance of the other dopant (e.g. the NIR dopant such as antimony) at the film surface 22 nearer the glass. The concentration of dopant changes from surface 18 to surface 22, so that one dopant changes from greater than 50% of the dopants at surface 18 to approximately 0% at surface 22. At an intermediate point 20, below upper surface 18, the predominant dopant at that point in the film changes from the predominant dopant at surface 18 to the predominant dopant at surface 22. Either the NIR dopant or the low emissivity dopant (fluorine) can be the predominant dopant at surface 18 with the other dopant the predominant dopant at surface 22. FIG. 4 depicts a coated glass having additional layers 24 and 26 in addition to a low emissivity layer 10 and NIR layer 12. The additional layers 24 and 26 can be additional low emissivity and/or NIR layers or other conventional layers used to coat glass such as a tinting layer. For example 12 can be a NIR layer (e.g. antimony doped tin), 10 a low emissivity layer (fluorine doped tin) and 24 another NIR layer 26 can be another low emissivity layer or some other conventional layer. The concentration of dopant when more than one low emissivity layer is utilized may be the same or different and the thickness of each low emissivity layers may also be the same or different. Likewise, when more than one NIR layer is utilized, the concentration of dopant and the selection of dopant (antimony, tungsten, vanadium, iron, chromium, molybdenum, niobium, cobalt and nickel) can be the same or different and the thickness of each NIR layer can be the same or different. Generally the dopant for the NIR layer has been discussed herein mostly in terms of antimony, it must be understood that the dopant in the NIR layer can be selected from the group consisting of antimony, tungsten, vanadium, iron, chromium, molybdenum, niobium, cobalt, nickel and mixtures thereof. Likewise, in the gradient layer embodiment of the invention as depicted in FIG. 3, the predominant dopant at the NIR surface either surface 18 or 22 can be selected from the group consisting of antimony, tungsten, vanadium, iron, chromium, molybdenum, niobium, cobalt, nickel and mixtures thereof, it only being essential that the low e dopant, e.g. fluorine, be the predominant dopant at the opposite surface. Combined with a gradient layer can be one or more NIR or low emissivity layers such as layers 10 and 12 in FIGS. 1 to 3 and/or other conventional layers.

Water is preferably used to accelerate the deposition of $SnO_2$ film onto glass as taught by U.S. Pat. No. 4,590,096 (Lindner) and used in concentrations from ~0.75 to 12.0 mol % $H_2O$ based upon the gas composition.

Another embodiment of this invention is the reduction of film haze. Haze is due to the scattering of incident light when it strikes a surface. It can be caused by surface roughness due to large crystallite size, a wide range of crystallite sizes and/or particulates imbedded in the film surface. It can also be caused by voids (holes) in the film due to the volatilization of an intermediate by-product such as NaCl. The films deposited by this invention have haze that is predominantly caused by surface roughness. Haze is reduced by the judicious inclusion or exclusion of certain additives in the coating process either at the glass-film interface or at the bi-layer film interface. By controlling the rugosity within the film layers in this manner, the rugosity and hence the haze of the top layer in the bilayer tin oxide coating is reduced. This is an improvement over the prior art which obtains haze reduction by adding an auxiliary layer on top of the functional layer. The sole purpose of the prior art auxiliary layer is to level the rough surface of the functional layer by filling in the areas between crystallite peaks and valleys.

One of these rugosity reducing additives is fluorine in either an inorganic form like HF or an organic form like trifluoroacetic acid (TFA) or ethyl trifluoroacetate for example. Other fluorine sources suitable for haze reduction are difluoroacetic acid, monofluoroacetic acid, antimony tri and pentafuoride, and ethyl trifluoroacetoacetate. When fluorine is present in all or part of the TOSb undercoat, the crystallite size is significantly decreased and the overall film haze is reduced. SEM micrographs show that the crystallite size of the topcoat has been affected by the reduced crystallite size of the undercoat. Other additives that have been found to be effective in reducing haze are acids such as acetic, formic, propionic, methanesulfonic, butyric and its isomers, nitric and nitrous acid. Haze also can be reduced by the exclusion of certain additives such as water. When water is not present during the deposition of the first few hundred angstroms of the undercoat, the overall crystallite size is reduced. Haze can also be reduced by combining one or more of the above aspects. If TFA is included in the deposition process when water is being excluded, the overall film haze is reduced. For example, when water is removed from the deposition of the first 50–60 nm of the TOSb layer, overall film morphology is reduced and haze values of ~0.8% are achieved. If TFA is added and water excluded from the deposition of the first 50–60 nm of the TOSb layer, similar morphology effects and haze values are recorded.

Fluorine, when added as a dopant into a tin oxide film, decreases emissivity and increases film conductivity. However, it is not functioning as such a traditional dopant in this invention when it is added to the antimony doped layer of the tin oxide coating. It functions in the antimony doped layer as a modifier of the crystallite size of the antimony doped tin oxide as manifested in the reduction of overall film haze (measured on a hazemeter and confirmed by SEM micrographs). The increase in sheet resistance with the associated increase in emissivity, shown in the results in Table 3, confirms the function of the added fluorine to the antimony doped tin oxide layer (TOSb). When fluorine is present in the TOSb layer, the resultant emissivity of the combined layer is increased, not decreased as would be expected if it were functioning as a dopant. While not willing to be bound to the explanation, it is believed that fluorine may preferentially bind to the antimony sites thereby effectively removing both as dopants in the film and hence the overall film emissivity would increase.

Another embodiment of the invention provides the ability to change the transmitted color of the coated glass. Transmitted color refers to the color perceived by a viewer on the opposite side of the coated glass from the source of light being viewed, while reflected color is the color perceived by a viewer on the same side as the source of light being viewed. Transmitted light can be effected by adding additional dopants to the NIR film. As previously explained, the NIR layer contains a dopant selected from the group consisting of antimony, tungsten, vanadium, iron, chromium, molybdenum, niobium, cobalt and nickel. The color of transmitted light through the NIR layer can be changed by adding an additional dopant different then the first dopant in the NIR layer and selected from the group consisting of tungsten, vanadium, iron, chromium, molybdenum, niobium, cobalt, nickel or a combination of more then one additional dopant to the NIR layer. The haze additive, fluorine, can also effect transmitted color. As shown in examples 40–43, the addition of a fluorine precursor, such as trifluoroacetic acid (TFA) to a NIR precursor solution such as $SbCl_3$/MBTC, produces a film whose transmitted color is gray versus a blue transmitted color for an antimony doped tin oxide layer without fluorine dopant. The additive has little or no effect on reflected light and accordingly, a coated glass can be produced having a reflected light that is different then its transmitted light.

Dopants in the NIR layer such as vanadium, nickel, chromium and non-traditional color additives such as trifluoroacetic acid (TFA) can be added to the TO:Sb precursors in 1–5 wt % (based on the total wt of precursor and additive) to effect transmitted color changes in the final film construction while not significantly affecting overall reflected color neutrality.

The preferred embodiments of our invention will be exemplified by the following examples. One skilled in the art will realize that minor variations outside the embodiments stated herein do not depart from the spirit and scope of this invention.

The most preferred embodiments, at this time, to obtain a coated glass with low e and NIR properties with neutral reflected color from a tin oxide coating composed of only two layers, irrespective of haze, are described in Examples 1 to 30. One layer is about a 3000 Å thick TO:F film (fluorine doped tin oxide) in combination with about a 2400 Å TO:Sb (antimony doped tin oxide) film on glass. The film thickness for the TO:F layer can range from ~2800–3200 Å and still achieve the surprising result of a neutral reflected color. The fluorine concentration can range from ~1–5 atomic %. The TO:Sb film thickness can range from ~2200–2600 Å with an antimony concentration from ~3–8% and still achieve the surprising result of a neutral reflected color for the coated glass. Within the preferred thickness and dopant concentration ranges of the present invention, a solar control coated glass can be produced having a NIR layer and a low e layer and having a Neutral-blue Color for reflected light, i.e. coated glass having reflected light predominately within C.I.E. chromaticity coordinates values of x between 0.285 and 0.310 and y between 0.295 and 0.325 as shown in FIG. 7 by a box labeled Neutral-blue Color.

All SHGC and U values in the tables have been determined using the single band approach of the NFRC Window 4.1 program. Use of the more accurate multiband approach (spectral data file required) will improve the SHGC's by approximately 14%.

The C.I.E. tristimulus values for the reflected and transmitted colors of the coated articles can be calculated according to ASTM Standard E 308, with Illuminant C used as the standard illuminant. From this ASTM Standard E 308, the color of an object can be specified with one of several different scales. The scale used for the coated articles in this invention is the C.I.E. 1931 chromaticity coordinates x and y. One can easily translate to the C.I.E. 1976 L*, a*, b* opponent-color scale by using the following equations:

$$x = X/(X+Y+Z)$$

$$y = (X+Y+Z)$$

$$L^* = 116(Y/Y_n)^{1/3} - 16$$

$$a^* = 500[(X/X_n)^{1/3} - (Y/Y_n)^{1/3}]$$

$$b^* = 200[(Y/Y_n)^{1/3} - (Z/Z_n)^{1/3}]$$

where X, Y, and Z are the C.I.E. tristimulus values of the coated article, and $X_n$, $Y_n$, and $Z_n$, are 98.074, 100.000, and 118.232, respectively, for Standard Illuminant C. from the L*, a*, b* values, the color saturation index, c*, can be calculated by the equation $c^* = [(a^*)^2 + (b^*)^2]^{1/2}$. A color saturation index of 12 or less is considered neutral.

The definition of Neutral-blue Color for reflected light, i.e. coated glass having reflected light predominately within C.I.E. chromaticity coordinates values of x between 0.285 and 0.310 and y between 0.295 and 0.325 as shown in FIG. 7 by a box labeled Neutral-blue Color correlates with C.I.E. 1976 L*, a*, b* of 37.85, −1.25, −5.9 and 39.62, −2.25, 1.5. A sample conversion follows:

Example 40 (Table 3)

5.5% SbCl$_3$

300/240 (F/Sb/Glass)

X=9.797

Y=9.404

Z=12.438 x=0.310 y=0.297

L*=36.751 a*=4.624 b*=−3.466 c*=5.778

Solar control properties of glass windows has been evaluated and rated by the United States of America, Environmental Protection Agency using an Energy Star rating system. An Energy Star rating for the Central Region of the United States requires a U-factor rating of 0.40 or lower and a SHGC rating of 0.55 or below. An Energy Star rating for the Southern Region of the United States requires a U-factor rating of 0.75 or lower and a SHGC rating of 0.40 or below. Coated glass having the NIR and Low e coatings of the present invention and when incorporated into windows of conventional design achieve the Energy Star ratings for the Central and/or Southern Region. For example a Vertical slider design window 3 feet wide by 4 feet high and having a frame absorption value of 0.5 as rated by the National Fenestration Rating Council (NFRC) and assembled with coated solar control glass of the present invention having a NIR film and a low e film within the preferred ranges for a Neutral-Blue Color achieves a SHGC of less than 0.40 and a U value of less than 0.64 for a monolith glass construction with a frame U-value of 0.7 or less and achieves a SHGC of less than 0.38 and a U value of less than 0.48 for an Insulated Glass Unit (IGU) construction made up with 2.5 mm clear lite, 0.5 inch air gap and NIR and Low e coatings on the #2 surface of the outer lite and a frame U-value of 1.0 or less.

Figure 5:
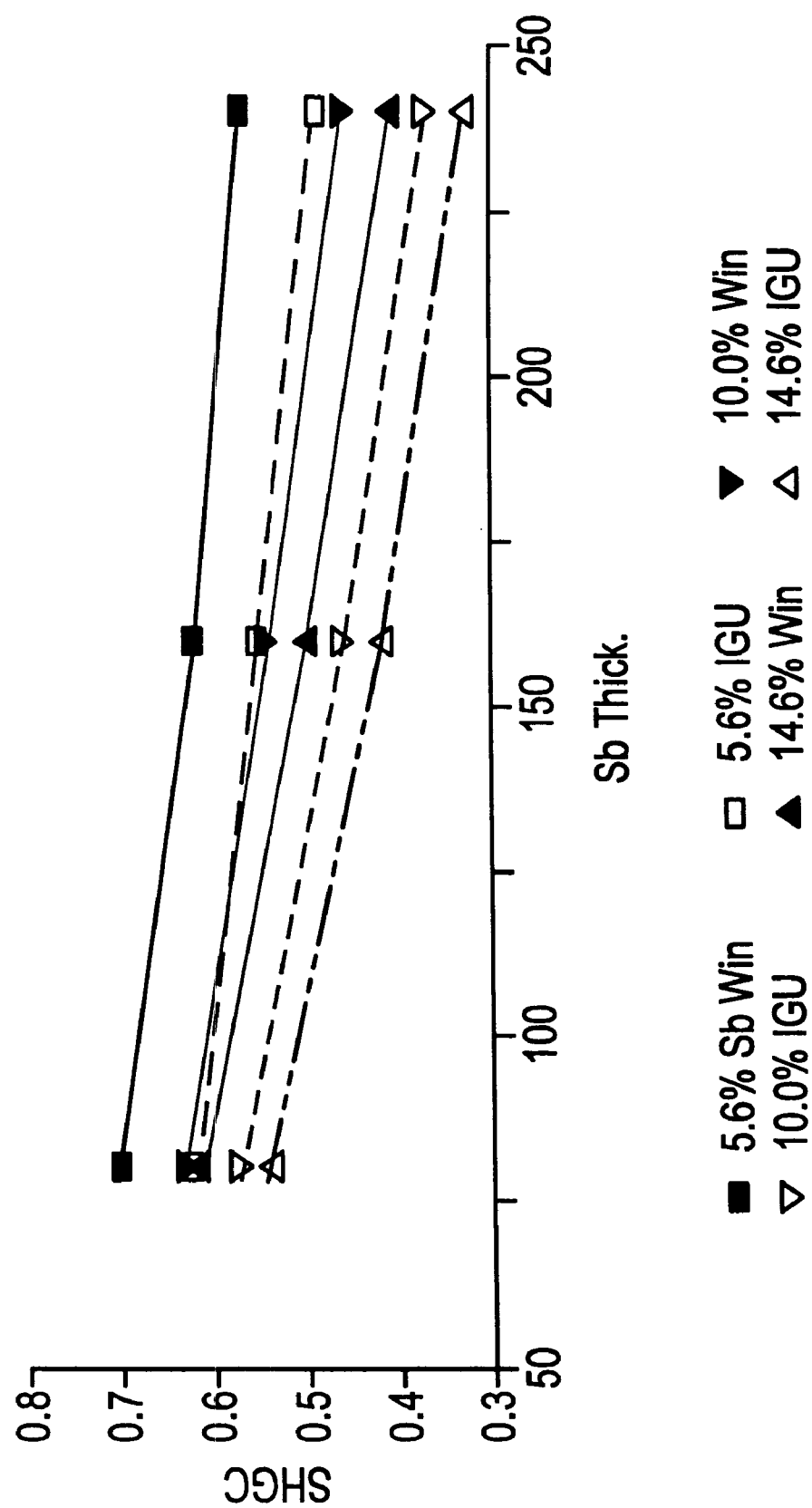
FIGS. 5 and 6 graphically depict the solar control achieved with antimony doped films at various concentrations of dopant and various film thicknesses on window panes, i.e. a single pane of glass, or on insulated glass units (IGU) which are a composite of at least two glass panes.
Figure 6:
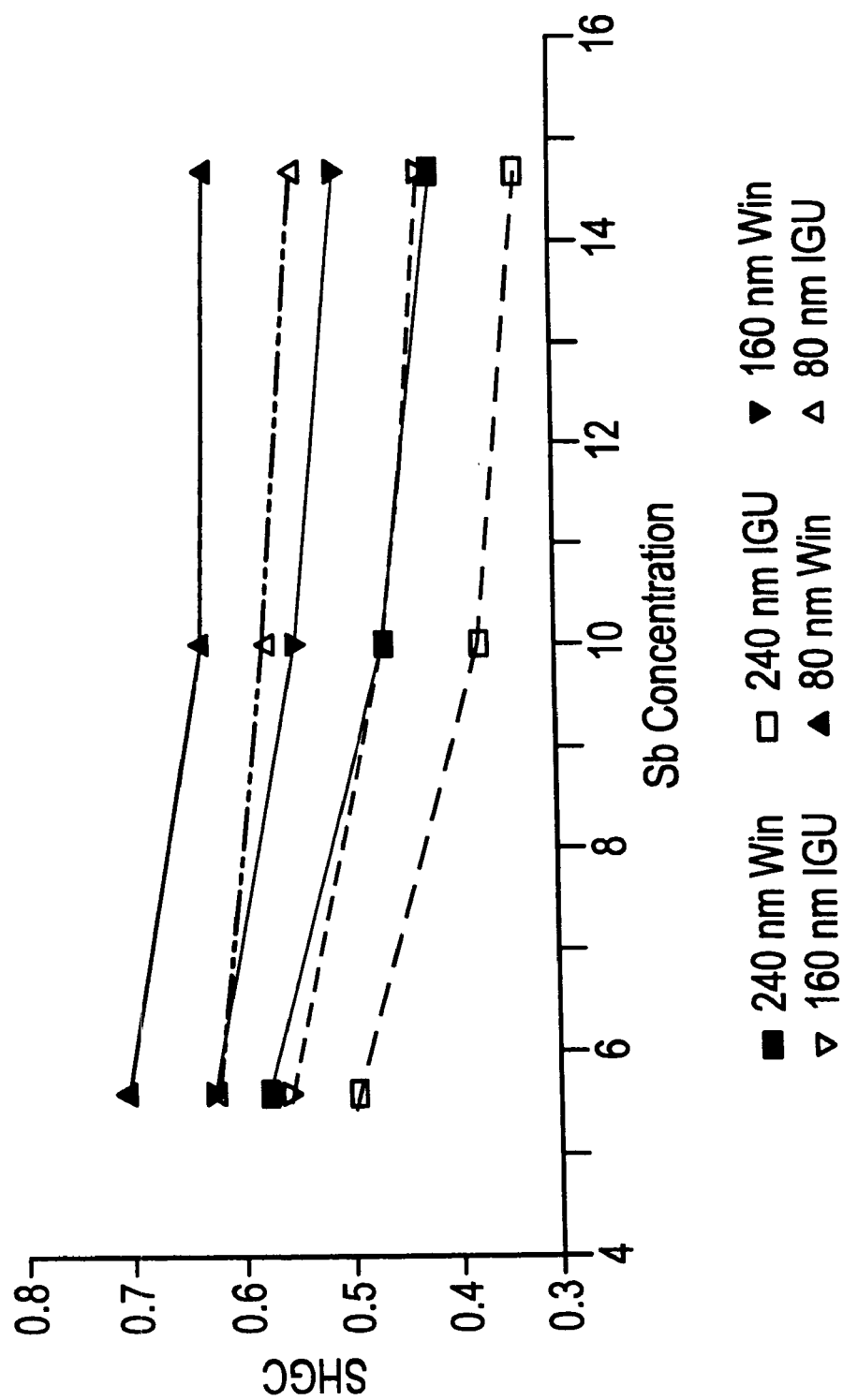

The examples will substantiate that with a minimum of two doped SnO$_2$ layers, an excellent solar control coated glass can be produced having a preselected reflected color. Tables 1, 2 and 3 present the data while FIGS. 5 and 6 show graphically how the solar properties of the coated glass vary with dopant concentrations and film thickness primarily of the NIR film. FIG. 7 plots the x and y C.I.E. chromaticity coordinates of a representative selection of coated glass of Examples 1 to 30. As seen in FIG. 7, specific combinations of film thicknesses for both the NIR and low emissivity films and specific dopant(s) concentrations can be utilized to produce a coated, solar control glass with any desired color for light reflected off the coated surface of the glass, such as red, green, yellow, blue and shades thereof or Neutral-blue Color. It is particularly surprising that a Neutral-blue Color can be achieved with a NIR and a low emissivity layers but without an anti-iridescence layer such as taught by Gordon.

While the inventive features of the present invention can be achieved with only two layers, a NIR layer and a low emissivity layer, multilayer embodiments are within the scope and content of the invention. The multilayers can be additional NIR and/or low emissivity layers or other functional or decorative layers. Multilayer embodiments include TOSb/TOF/TOSb/Glass, or TO/TOF/TOSb/Glass, or TO/TOSb/TOF/Glass with TO being just a tin oxide film. When multiple NIR or low emissivity layers are used, the dopant concentrations or dopant selection in each NIR or low emissivity film need not be the same. For example when two NIR layers are used in combination with at least one low emissivity layer, one NIR layer can have a low level of antimony dopant (e.g. 2.5%) to give some reflectance in the mid IR range and one layer can have a higher level ($\geq 5\%$) to give NIR absorbency. The terms layer and film are generally used herein interchangeably except in the discussion of gradient film depicted in FIG. 3 in which a portion of the film is referred to as a layer having a dopant concentration different than the dopant concentration in another layer of the film. In the method of making the coated glass of the present invention as demonstrated in the examples, the glass is contacted sequentially with carrier gas containing precursors. Accordingly, the glass may have a coating on it when it is contacted a second time with a carrier gas containing precursors. Therefore, the term "contacting glass" refers to either direct contact or contact with one or more coatings previously deposited on the glass. The best ways to practice the haze reduction aspects of this invention are described in Examples 40–43 and 48–61. The results are summarized in Tables 3, 4, and 5.

EXAMPLES 1 TO 30

A 2.2 mm thick glass substrate (soda lime silica), two inches square, was heated on a hot block to 605 to 625° C. The substrate was positioned 25 mm under the center section of a vertical concentric tube coating nozzle. A carrier gas of dry air flowing at a rate of 15 liters per minute (l/min) was heated to 160° C. and passed through a hot wall vertical vaporizer. A liquid coating solution containing ~95 wt % monobutyltin trichloride and ~5 wt % antimony trichloride was fed to the vaporizer via a syringe pump at a volume flow designed to give a 0.5 mol % organotin concentration in the gas composition. A quantity of water was also fed into the vaporizer at a flow designed to give a 1.5 mol % water vapor in the gas mixture. The gas mixture was allowed to impinge on the glass substrate at a face velocity of 0.9 m/sec for ~6.1 seconds resulting in the deposition of a film of antimony doped tin oxide ~240 nm thick. Immediately following, a second gas mixture was used consisting of a precursor composition of 95 wt % monobutyltin trichloride and 5 wt % trifluoroacetic acid, along with water in the same concentrations and carrier gas as used before to deposit the antimony doped $SnO_2$ layer. This second gas mixture was allowed to impinge on the coated substrate for ~6.7 seconds. A film of ~280 nm of fluorine doped tin oxide was deposited. The bilayer film was very light blue in transmission and reflection. The optical properties were measured on a UV/VIS/NIR spectrophotometer and the sheet resistance was measured on a standard four point probe. The solar heat gain coefficient, U value and visible transmission for the center of the glass were calculated using the Window 4.1 program developed by Lawrence Berkeley National Laboratory, Windows and Daylight Group, Building Technologies Program, Energy and Environmental Division. The C.I.E. chromaticity x and y color coordinates were calculated using ASTM E308-96 from the visible reflectance data between 380–770 nm and the tristimulus values for Illuminant C. The analysis results for this film appears in Table 1, number 19. The procedure of this example was repeated 29 additional times with concentrations of chemical precursors and deposition times varied in order to produce coated glass samples having different thicknesses for the NIR and low emissivity layers and different dopant concentrations. The results are presented in Table 1.

TABLE 1

Summary of Properties of Bilayer Films TOF/TOSb

| # | 1 | 2 | 3 | 4 | 5 | 6 | 7 | 8 |
|---|---|---|---|---|---|---|---|---|
| Composit. | F/Sb/G | F/Sb/G | F/Sb/G | F/Sb/G | F/Sb/G | F/Sb/G | F/Sb/G | F/Sb/G |
| % Sb | 2.5 | 2.5 | 2.5 | 2.5 | 2.5 | 5.6 | 5.6 | 5.6 |
| Thick. nm | 300/240 | 300/160 | 300/80 | 400/240 | 400/80 | 300/240 | 300/240 | 300/160 |
| % Asol | 16.1 | 12.7 | 9.7 | 17.0 | 11.0 | 40.8 | 39.2 | 31.1 |
| % Tsol | 72.0 | 74.6 | 76.4 | 72.0 | 76.9 | 50.0 | 51.1 | 58.2 |
| % Rsol. 1 | 11.8 | 12.7 | 13.9 | 11.0 | 12.1 | 9.2 | 9.6 | 10.7 |
| % Rsol. 2 | 10.9 | 11.7 | 12.8 | 10.3 | 11.5 | 8.2 | 9.2 | 9.4 |
| % Tvis | 78.0 | 80.5 | 80.0 | 77.7 | 82.0 | 57.4 | 58.5 | 65.5 |
| % Rvis. 1 | 12.0 | 12.1 | 14.6 | 11.2 | 11.9 | 9.2 | 9.8 | 10.1 |
| % Rvis. 2 | 10.9 | 11.3 | 13.4 | 10.5 | 11.6 | 8.3 | 9.3 | 8.6 |
| % Tuv | 52.3 | 52.9 | 55.2 | 51.1 | 53.6 | 41.2 | 41.5 | 45.3 |
| S.R. | 12.4 | 13.2 | 16.0 | 10.4 | 13.3 | 11.2 | 11.8 | 13.3 |
| Emis-cal | 0.12 | 0.13 | 0.15 | 0.10 | 0.13 | 0.11 | 0.11 | 0.13 |
| SHGCc | 0.74 | 0.77 | 0.78 | 0.75 | 0.79 | 0.57 | 0.58 | 0.63 |
| SHGCc IG | 0.67 | 0.70 | 0.71 | 0.67 | 0.71 | 0.49 | 0.5 | 0.56 |
| Uc | 0.72 | 0.72 | 0.74 | 0.71 | 0.73 | 0.71 | 0.72 | 0.72 |
| Uc IG | 0.27 | 0.28 | 0.28 | 0.27 | 0.28 | 0.27 | 0.27 | 0.28 |
| Tvis-c | 0.78 | 0.81 | 0.80 | 0.78 | 0.82 | 0.57 | 0.58 | 0.66 |
| Tvis-c IG | 0.71 | 0.73 | 0.73 | 0.71 | 0.74 | 0.52 | 0.53 | 0.59 |
| x | 0.291 | 0.329 | 0.295 | 0.326 | 0.323 | 0.293 | 0.292 | 0.331 |
| y | 0.336 | 0.289 | 0.377 | 0.317 | 0.282 | 0.303 | 0.309 | 0.280 |
| % Rvis | 12.0 | 12.1 | 14.7 | 11.2 | 11.9 | 9.2 | 9.8 | 10.1 |
| R colors | Blue-Gr | Neutral | Green | Green-Bi | Neutral | Blue | Blue | Neutral |

| # | 9 | 10 | 11 | 12 | 13 | 14 | 15 |
|---|---|---|---|---|---|---|---|
| Composit. | F/Sb/G | F/Sb/G | F/Sb/G | F/Sb/G | F/Sb/G | F/Sb/G | F/Sb/G |
| % Sb | 5.6 | 5.6 | 5.6 | 5.6 | 5.6 | 5.6 | 5.6 |
| Thick. nm | 300/80 | 300/240 | 300/252 | 300/232 | 300/225 | 300/240 | 400/240 |
| % Asol | 20.7 | 39.2 | 41.5 | 39.0 | 37.1 | 40.1 | 40.3 |
| % Tsol | 67.5 | 51.6 | 49.2 | 52.2 | 53.9 | 51.0 | 50.6 |
| % Rsol. 1 | 11.8 | 9.2 | 9.3 | 8.9 | 9.1 | 8.9 | 9.1 |
| % Rsol. 2 | 10.8 | 8.5 | 8.5 | 8.4 | 8.6 | 8.4 | 8.2 |
| % Tvis | 72.7 | 57.6 | 54.8 | 58.0 | 59.8 | 56.8 | 56.5 |
| % Rvis. 1 | 14.0 | 8.9 | 9.0 | 8.4 | 8.4 | 8.6 | 8.6 |
| % Rvis. 2 | 11.3 | 8.6 | 8.5 | 8.3 | 8.2 | 8.2 | 8.3 |
| % Tuv | 50.6 | 43.1 | 42.6 | 44.3 | 44.9 | 42.4 | 42.1 |
| S.R. | 15.6 | 12.2 | 12.5 | 13.4 | 13.8 | 13.1 | 9.7 |

TABLE 1-continued

Summary of Properties of Bilayer Films TOF/TOSb

| Emis-cal | 0.15 | 0.12 | 0.12 | 0.13 | 0.13 | 0.13 | 0.10 |
|---|---|---|---|---|---|---|---|
| SHGCc | 0.71 | 0.58 | 0.56 | 0.59 | 0.6 | 0.58 | 0.57 |
| SHGCc IG | 0.63 | 0.51 | 0.58 | 0.51 | 0.52 | 0.5 | 0.49 |
| Uc | 0.74 | 0.72 | 0.72 | 0.73 | 0.73 | 0.73 | 0.71 |
| Uc IG | 0.28 | 0.27 | 0.27 | 0.28 | 0.28 | 0.28 | 0.27 |
| Tvis-c | 0.73 | 0.58 | 0.55 | 0.58 | 0.6 | 0.57 | 0.56 |
| Tvis-c IG | 0.66 | 0.52 | 0.5 | 0.53 | 0.54 | 0.52 | 0.51 |
| x | 0.318 | 0.288 | 0.291 | 0.294 | 0.302 | 0.294 | 0.322 |
| y | 0.364 | 0.300 | 0.300 | 0.309 | 0.315 | 0.306 | 0.318 |
| % Rvis | 13.9 | 9.0 | 9.0 | 8.4 | 8.4 | 8.6 | 8.6 |
| R colors | Green-Yl | Blue | Blue | Blue | Blue | Blue | Red |

| # | 16 | 17 | 18 | 19 | 20 | 21 | 22 | 23 |
|---|---|---|---|---|---|---|---|---|
| Composit. | F/Sb/G | F/Sb/G | F/Sb/G | F/Sb/G | F/Sb/G | F/Sb/G | F/Sb/G | F/Sb/G |
| % Sb | 5.6 | 5.6 | 5.6 | 5.6 | 5.6 | 6.5 | 10.0 | 10.0 |
| Thick. nm | 370/240 | 338/240 | 300/240 | 280/240 | 262/240 | 300/24 | 300/240 | 300/160 |
| % Asol | 45.0 | 40.2 | 40.3 | 43.2 | 39.4 | 29.6 | 54.5 | 41.8 |
| % Tsol | 45.4 | 50.7 | 50.6 | 46.6 | 51.2 | 46.4 | 37.0 | 47.8 |
| % Rsol. 1 | 9.6 | 9.1 | 9.1 | 10.2 | 9.4 | 9.9 | 8.5 | 10.4 |
| % Rsol. 2 | 8.0 | 8.4 | 8.5 | 8.4 | 8.5 | 8.4 | 7.8 | 9.1 |
| % Tvis | 51.0 | 56.5 | 56.5 | 51.6 | 57.0 | 51.2 | 36.4 | 48.6 |
| % Rvis. 1 | 8.8 | 8.8 | 8.9 | 10.0 | 9.0 | 9.9 | 8.5 | 10.0 |
| % Rvis. 2 | 8.3 | 8.7 | 8.3 | 7.9 | 8.0 | 8.5 | 7.2 | 7.8 |
| % Tuv | 39.8 | 43.0 | 42.8 | 41.6 | 44.8 | 40.7 | 35.1 | 41.0 |
| S.R. | 11.5 | 11.3 | 13.6 | 13.7 | 15 | 12.9 | 15.4 | 17.7 |
| Emis-cal | 0.11 | 0.11 | 0.13 | 0.13 | 0.14 | 0.12 | 0.15 | 0.16 |
| SHGCc | 0.53 | 0.57 | 0.57 | 0.54 | 0.58 | 0.54 | 0.47 | 0.55 |
| SHGCc IG | 0.45 | 0.49 | 0.49 | 0.46 | 0.5 | 0.46 | 0.38 | 0.47 |
| Uc | 0.72 | 0.71 | 0.73 | 0.73 | 0.73 | 0.72 | 0.74 | 0.74 |
| Uc IG | 0.27 | 0.27 | 0.28 | 0.28 | 0.28 | 0.28 | 0.29 | 0.29 |
| Tvis-c | 0.51 | 0.56 | 0.56 | 0.52 | 0.57 | 0.51 | 0.36 | 0.49 |
| Tvis-c IG | 0.46 | 0.51 | 0.51 | 0.47 | 0.52 | 0.46 | 0.33 | 0.44 |
| x | 0.306 | 0.296 | 0.298 | 0.303 | 0.318 | 0.297 | 0.320 | 0.353 |
| y | 0.320 | 0.308 | 0.312 | 0.321 | 0.324 | 0.305 | 0.327 | 0.294 |
| % Rvis | 9.0 | 8.8 | 8.9 | 10.0 | 9.0 | 9.9 | 8.5 | 9.9 |
| R colors | Blue-Gr | Blue | Blue | Blue-Gr | Yl-Green | Blue | Yl-Neu | Red |

| # | 24 | 25 | 26 | 27 | 28 | 29 | 30 |
|---|---|---|---|---|---|---|---|
| Composit. | F/Sb/G | F/Sb/G | F/Sb/G | F/Sb/G | F/Sb/G | F/Sb/G | F/Sb/G |
| % Sb | 10.0 | 10.0 | 10.0 | 10.0 | 14.6 | 14.6 | 14.6 |
| Thick. nm | 300/80 | 300/300 | 400/240 | 400/80 | 300/240 | 300/160 | 300/80 |
| % Asol | 25.9 | 62.5 | 55.4 | 24.8 | 59.9 | 47.8 | 29.9 |
| % Tsol | 62.4 | 29.7 | 35.9 | 63.6 | 31.9 | 42.9 | 57.5 |
| % Rsol. 1 | 11.7 | 7.8 | 8.7 | 11.6 | 8.2 | 9.3 | 12.6 |
| % Rsol. 2 | 11.2 | 7.5 | 7.5 | 10.7 | 7.7 | 8.6 | 11.2 |
| % Tvis | 64.0 | 28.5 | 34.8 | 68.3 | 28.3 | 41.3 | 58.1 |
| % Rvis. 1 | 13.3 | 7.7 | 7.6 | 10.1 | 8.9 | 7.8 | 14.7 |
| % Rvis. 2 | 9.6 | 6.9 | 7.6 | 10.0 | 7.1 | 7.2 | 9.9 |
| % Tuv | 48.8 | 30.4 | 33.2 | 48.9 | 27.5 | 34.9 | 44.4 |
| S.R. | 18.8 | 15 | 12.8 | 15.4 | 15.1 | 15.7 | 18.6 |
| Emis-cal | 0.17 | 0.14 | 0.12 | 0.14 | 0.14 | 0.15 | 0.17 |
| SHGCc | 0.67 | 0.41 | 0.45 | 0.68 | 0.42 | 0.51 | 0.63 |
| SHGCc IG | 0.59 | 0.32 | 0.39 | 0.60 | 0.34 | 0.43 | 0.55 |
| Uc | 0.75 | 0.73 | 0.72 | 0.73 | 0.73 | 0.74 | 0.75 |
| Uc IG | 0.29 | 0.28 | 0.27 | 0.28 | 0.28 | 0.28 | 0.29 |
| Tvis-c | 0.64 | 0.28 | 0.35 | 0.68 | 0.28 | 0.41 | 0.58 |
| Tvis-c IG | 0.58 | 0.26 | 0.32 | 0.62 | 0.26 | 0.37 | 0.53 |
| x | 0.324 | 0.343 | 0.299 | 0.299 | 0.331 | 0.344 | 0.335 |
| y | 0.378 | 0.306 | 0.322 | 0.312 | 0.329 | 0.305 | 0.393 |
| % Rvis | 13.2 | 7.7 | 7.6 | 10.1 | 8.8 | 7.8 | 14.6 |
| R colors | Yl-Green | Neutral | Blue-Gr | Blue | Yl-Green | Neutral | Yl-Green |

EXAMPLES 31 TO 38

The procedure of Example 1 was repeated, except that the vapor feed order was reversed. The fluorine doped tin oxide film was deposited first for ~8 seconds followed by the antimony doped tin oxide film for ~6 seconds. The resulting film was ~540 nm thick and composed of a low emissivity layer (TOF) of about 300 nm and a NIR layer (TOSb) of about 240 nm and had a similar appearance and reflected light color (Neutral-blue Color) as the film in example 19. The analysis results appear in Table 2, number 31. The procedure of this example was repeated 7 additional times with concentrations of chemical precursors and deposition times varied in order to produce coated glass samples having different thicknesses for the NIR and low emissivity layers and different dopant concentrations. The results are presented in Table 2.

TABLE 2

Summary of Properties of Bilayer Films TOSb/TOF

| # | 31 | 32 | 33 | 34 | 35 | 36 | 37 | 38 |
|---|---|---|---|---|---|---|---|---|
| Composit. | Sb/F/G | Sb/F/G | Sb/F/G | Sb/F/G | Sb/F/G | Sb/F/G | Sb/F/G | Sb/F/G |
| % Sb | 5.6 | 5.6 | 5.6 | 5.6 | 5.6 | 5.6 | 5.6 | 5.6 |
| Thick. nm | 240/300 | 160/300 | 138/300 | 120/300 | 110/300 | 80/300 | 120/332 | 120/262 |
| % Asol | 47.9 | 36.1 | 29.2 | 27.2 | 25.6 | 23.5 | 28.5 | 26.8 |
| % Tsol | 45.9 | 55.5 | 61.1 | 63.3 | 64.3 | 65.8 | 62.5 | 63.4 |
| % Rsol, 1 | 6.1 | 8.3 | 9.7 | 9.6 | 10.2 | 10.7 | 9.0 | 9.8 |
| % Rsol, 2 | 8.2 | 9.3 | 10.1 | 9.5 | 9.2 | 9.2 | 9.2 | 9.6 |
| % Tvis | 53.2 | 63.2 | 67.2 | 69.0 | 69.5 | 71.8 | 69.0 | 68.1 |
| % Rvis, 1 | 6.1 | 7.6 | 9.3 | 9.1 | 10.1 | 10.9 | 7.8 | 9.9 |
| % Rvis, 2 | 7.6 | 8.9 | 10.7 | 10.4 | 10.5 | 10.9 | 8.9 | 11.6 |
| % Tuv | 38.5 | 43.4 | 47.0 | 48.7 | 49.2 | 49.1 | 47.7 | 49.6 |
| S. R. | 14.7 | 15.9 | 16.5 | 17.4 | 18.8 | 17.3 | 15 | 21.1 |
| Emis-cal | 0.14 | 0.15 | 0.15 | 0.16 | 0.17 | 0.16 | 0.14 | 0.19 |
| SHGCc | 0.54 | 0.61 | 0.66 | 0.68 | 0.69 | 0.7 | 0.67 | 0.68 |
| SHGCc IG | 0.45 | 0.53 | 0.58 | 0.6 | 0.61 | 0.62 | 0.59 | 0.6 |
| Uc | 0.73 | 0.74 | 0.74 | 0.74 | 0.75 | 0.74 | 0.73 | 0.76 |
| Uc IG | 0.28 | 0.28 | 0.29 | 0.29 | 0.29 | 0.29 | 0.28 | 0.3 |
| Tvis-c | 0.53 | 0.63 | 0.67 | 0.69 | 0.69 | 0.72 | 0.69 | 0.68 |
| Tvis-c IG | 0.48 | 0.57 | 0.61 | 0.63 | 0.63 | 0.65 | 0.63 | 0.62 |
| x | 0.289 | 0.309 | 0.310 | 0.311 | 0.313 | 0.302 | 0.306 | 0.292 |
| y | 0.300 | 0.283 | 0.274 | 0.275 | 0.306 | 0.364 | 0.281 | 0.349 |
| % Rvis | 6.2 | 7.7 | 9.3 | 9.1 | 10.1 | 10.9 | 7.8 | 9.9 |
| R Colors | Blue | Blue-Neu | Blue-Gr | Blue-Gr | Neutral | Greeen | Blue-Neu | Green |

EXAMPLE 39

The procedure of Example 1 was repeated but utilizing three precursor feed mixtures. The composition of the third mixture was 90 wt % monobutyltin trichloride, 5 wt % trifluoroacetic acid, and 5 wt % antimony trichloride. A gradient film was deposited by first depositing only the antimony doped tin oxide precursor of Example 1 for 70% of the time needed to deposit 240 nm. Then the mixed antimony/fluorine doped precursor was started. Both precursor mixtures would continue for 20% of the total deposition time at which point the antimony precursor mixture was turned off. The antimony/fluorine mixed precursor was continued for the remaining 10% of the total deposition time for the 240 nm antimony film. At this point, the fluorine doped tin oxide film precursor feed was turned on. Both feeds were continued for 20% of the total time needed to deposit 300 nm of fluorine doped tin oxide. The mixed antimony/fluorine precursor feed was turned off and the fluorine doped tin precursor was continued for the remaining deposition time for the fluorine doped film. The resultant gradient coating layer is light blue in transmitted and reflected color (x=0.292, y=0.316) a SHGC=0.50, a U value=0.6, and a visible transmission about 45%. As shown in FIG. 3, surface 22 of gradient film 16 would have essentially 100% antimony dopant while surface 18 would have essentially 100% fluorine dopant with a gradient in dopant concentration between surfaces 18 and 22 and all within a film matrix of $SnO_2$.

EXAMPLES 40 TO 43

The procedure of Example 1 was used in Examples 40 to 43. The coating composition for the NIR layer in Examples 41 and 43 was composed of a fluorine, antimony, and tin precursor made by adding SbCl3 and TFA to MBTC. This precursor contained 0–5% by weight TFA, 5.2–5.5% by weight SbCl3, and the remainder MBTC, and was co-fed with water into the second vaporizer. The carrier gas used for the second vaporizer was dry air at a rate of 15 l/min. The fluorine/antimony/tin precursor was added at a rate of 0.5 mole percent of total carrier gas flow, the water was added at a rate of 1.5 mole percent total carrier gas flow, and the vaporizer temperature was maintained at 160 C. A soda-lime-silica glass substrate two inches square and 2.2 mm thick was preheated on a heater block to 605 to 625 C. The heater block and substrate were then moved to a position directly beneath the vertical coater nozzle, with the substrate being 25 mm beneath the coater nozzle. F/Sb/Sn/H2O vapors from the second vaporizer were then directed onto the glass substrate, depositing a fluorine containing antimony doped tin oxide undercoat layer in examples 41 and 43. The velocity of the carrier gas was 0.9 m/s and the thickness of the doped tin oxide film was ~240 nm. Reaction byproducts and unreacted precursor vapors were exhausted from the substrate at a rate of 18 l/min. After the antimony and fluorine doped tin oxide undercoat was deposited, the coater nozzle valve was switched from the second vaporizer feed to the first vaporizer feed. MBTC/TFA/H2O vapors from the first vaporizer feed were then directed onto the substrate, depositing a layer of fluorine doped tin oxide directly on top of the antimony/fluorine tin oxide undercoat. The velocity of the carrier gas was 0.9 m/s and the thickness of the fluorine doped tin oxide film was ~300 nm. The bilayer films in examples 41 and 43 (containing both F and Sb in the NIR undercoat) were light grey in transmitted color and neutral in reflected color. Examples 40 and 42 essentially reproduce examples 41 and 43 respectively but without fluorine in the NIR undercoat layer. The properties were measured and the results appear in Table 3. The results show how fluorine, as an additive in the NIR layer, acts as a color modifier as well as a haze reducer for both reflected and transmitted color. The transmitted colors, $T_{vis}$, x and y, of the films made with the TFA and Sb dopants in the NIR layer, Examples 41 and 43, are more neutral in reflected color and greyer in transmitted color then those which only contained Sb as a dopant in the antimony doped tin oxide NIR layer in examples 40 and 42. Furthermore, the antimony doped NIR layer with a color effecting quantity of fluorine dopant has greater transmission of visible light (increase in $T_{vis}$, from 54.5 to 58.5 in example 41 versus example 42 with the some level of antimony dopant).

TABLE 3

Summary of Properties of Bilayer Films TOSb/TOF

| | Ex. # | | | |
|---|---|---|---|---|
| | 40 | 41 | 42 | 43 |
| Composit. | F/Sb/G | F/Sb-F/G | F/Sb/G | F/Sb-F/G |
| % SbCl3 | 5.5 | 5.2 | 5.2 | 5.36 |
| % Additive | 0 TFA | 5 TFA | 0 TFA | 2.5 TFA |
| Thick. nm | 300/240 | 300/240 | 300/240 | 300/240 |
| % Asol | 45.5 | 35.7 | 41.8 | 39.1 |
| % Tsol | 45.0 | 54.2 | 48.2 | 50.6 |
| % Rsol, 1 | 9.5 | 10.1 | 10.0 | 10.3 |
| % Rsol, 2 | 8.0 | 8.9 | 8.4 | 8.7 |
| % Tvis | 50.9 | 58.5 | 54.5 | 55.6 |
| % Rvis, 1 | 9.4 | 10.1 | 10.4 | 10.3 |
| % Rvis, 2 | 8.0 | 9.0 | 8.5 | 9.0 |
| % Tuv | 40.1 | 41.1 | 41.6 | 39.8 |
| S. R. | 11.9 | 13.7 | 11.8 | 12.5 |
| Emis-cal | 0.12 | 0.13 | 0.11 | 0.12 |
| Glass L # | 6235 | 6236 | 6237 | 6238 |
| SHGCc | 0.53 | 0.60 | 0.55 | 0.57 |
| SHGCc IG | 0.45 | 0.52 | 0.47 | 0.49 |
| Uc | 0.72 | 0.73 | 0.72 | 0.72 |
| Uc IG | 0.27 | 0.28 | 0.27 | 0.27 |
| Tvis-c | 0.51 | 0.59 | 0.55 | 0.56 |
| Tvis-c IG | 0.46 | 0.53 | 0.50 | 0.51 |
| R1 x | 0.310 | 0.296 | 0.302 | 0.303 |
| R1 y | 0.297 | 0.313 | 0.299 | 0.306 |
| % Rvis | 9.4 | 10.1 | 10.4 | 10.3 |
| Tvis x | 0.294 | 0.308 | 0.297 | 0.304 |
| Tvis y | 0.308 | 0.315 | 0.310 | 0.314 |
| % Haze | 2.22 ± 0.18 | 1.60 ± 0.29 | 2.34 ± 0.19 | 1.72 ± 0.26 |

Examples 44 through 47 demonstrate the deposition of films with the following composition: TOF/TOSb (low Sb conc.)/TOSb (high Sb conc.)/Glass, TOF/TOSb (high Sb conc.)/TOSb (low Sb conc.)/Glass, TOSb (low Sb)/TOF/TOSb (high Sb conc.)/Glass, and TOSb (high Sb)/TOF/TOSb (low Sb conc.)/Glass.

EXAMPLE 44

The procedure of Example 1 was repeated except that the glass temperature was about 610° C. and the concentration of reagents was about 0.63 mol % in air flowing at a rate of 20 liters per minute. About 400 Å of antimony doped tin oxide was deposited first from a liquid coating solution composed of about 10 wt % antimony trichloride and ~90% monobutyltin trichloride. Immediately following, a second layer of about 2000 Å of antimony doped tin oxide from a liquid coating solution composed of 3.25% antimony trichloride and 96.75% monobutlytin trichloride was deposited. A third layer composed of about 3000 Å of fluorine doped tin oxide was deposited from a solution containing 5 wt % trifluoroacetic acid and 95 wt % monobutyltin trichloride. The resulting film appeared to have a light green-blue color for reflected light and light blue color for transmitted light. The film properties were measured as described in Example 1. The visible light transmission was 64% and the SHGC was calculated to be 0.56. The x and y coordinates for the color of reflected light were 0.304 and 0.299, respectively, putting the film in the neutral-blue color quadrant of C.I.E. color space as defined earlier.

EXAMPLE 45

The procedure of Example 44 was repeated, but this time the TOSb layers were deposited in reverse order (sometimes referred to herein as reverse construction). The resulting film was blue-red in reflected color with color coordinates of (x) 0.330 and (y) 0.293, respectively. A visible transmission of 59% and a SHGC of 0.54 were obtained. One skilled in the art will realize that the TOSb layers can be of different thicknesses and concentrations than described herein and still be within the scope of this invention.

EXAMPLE 46

The procedure of Example 44 was repeated, but in this example the deposition sequence of the fluorine doped tin oxide layer and the 3.25% antimony trichloride solution layer were reversed. The resulting film had a visible transmission of about 62%, a SHGC of 0.55, and a neutral blue-red reflected color characterized by color coordinates (x) 0.311 and (y) 0.311.

EXAMPLE 47

The procedure of Example 45 was repeated, but in this example the deposition sequence of the fluorine doped tin oxide layer and the 10.0% antimony trichloride solution layer were reversed. The resulting film had a visible transmission of about 57%, a SHGC of 0.53, and a light green reflected color characterized by color coordinates (x) 0.308 and (y) 0.341. One skilled in the art will realize that the TOSb layers can be of different thicknesses and concentrations than described herein and still be within the scope of this invention.

EXAMPLE 48

The procedure of Example 41 was repeated with the following changes. The precursor coating composition for the NIR layer was composed of 5% by weight TFA, 4.35% by weight SbCl3, and the remainder MBTC. The carrier gas used for the vaporization was dry air at a rate of 20 l/min. The fluorine/antimony/tin precursor was added at a rate of 1.5 mol percent of total carrier gas flow, the water was added at a rate of 7.5 mol percent total carrier gas flow, and the vaporizer temperature was maintained at 160 C. A soda-lime-silica glass substrate two inches square and 2.2 mm thick was preheated on a heater block to 640° C. Precursor vapors were directed onto the glass substrate at a velocity of ~1.2 m/s and a fluorine and antimony containing tin oxide film of ~240 nm was deposited at a rate of ~1200 Å/sec. Immediately after this deposition, a fluorine doped tin oxide layer of ~300 nm was deposited at the same rate from a vapor composition of 1.5 mol percent TFA/MBTC (5% by weight TFA and 95% by weight MBTC), 7.5 mol percent water vapor and the remainder air. The bilayer film was blue-green in reflected color and had a haze value of 1.20% as measured on a Gardner Hazemeter.

EXAMPLE 49

The procedure of Example 48 was repeated but water was omitted from the vapor stream for the deposition of the first ~300–600 Å of the antimony and fluorine containing tin oxide first layer. The resulting film had a measured haze of 0.97%, a 20% reduction from the previous Example.

COMPARATIVE EXAMPLE 50

The procedure of Example 40 was repeated with the following changes. The precursor coating composition for the NIR layer was composed of 6.75% by weight SbCl3 and the remainder MBTC. The carrier gas used for the vaporization was dry air at a rate of 20 l/min. The antimony/tin precursor was added at a rate of 1.5 mol percent of total carrier gas flow, the water was added at a rate of 7.5 mol percent of total carrier gas flow, and the vaporizer temperature was maintained at 160 C. A soda-lime-silica glass substrate two inches square and 2.2 mm thick was preheated on a heater block to 648° C. Precursor vapors were directed onto the glass substrate at a velocity of ~1.2 m/s and an antimony doped tin oxide film of ~240 nm was deposited at a rate of ~1200 Å/sec. Immediately after this deposition, a fluorine doped tin oxide layer of ~300 nm was deposited at the same rate from a vapor composition of 1.5 mol percent TFA/MBTC (5% by weight TFA and 95% by weight MBTC), 7.5 mol percent water vapor and the remainder air. The bilayer film was blue-green in reflected color and had a haze value of 1.34% as measured on a Gardner Hazemeter.

EXAMPLE 51

The procedure of Example 50 was repeated but water was omitted from the vapor stream for the deposition of the first ~300–600 Å of the antimony doped tin oxide first layer. The resulting film had a measured haze of 0.90%, a 33% reduction from the previous Example.

EXAMPLE 52

The procedure of Example 51 was repeated but 5% by weight TFA was added to the precursor solution for the deposition of the first ~300–600 Å of the antimony doped tin oxide first layer. The resulting film had a measured haze of 0.83%, a 38% reduction from the haze in Example 50.

EXAMPLE 53

The procedure of Example 50 was repeated but 5% by weight TFA was added to the precursor solution for the deposition of the antimony doped tin oxide first layer. The resulting bilayer film had a measured haze of 1.17%.

EXAMPLE 54

The procedure of Example 40 was repeated with the following changes. The precursor coating composition for the NIR layer was composed of 6.75% by weight SbCl3 and the remainder MBTC. The carrier gas used for the vaporization was dry air at a rate of 20 l/min. The antimony/tin precursor was added at a rate of 1.5 mol percent of total carrier gas flow, the water was added at a rate of 1.5 mol percent total carrier gas flow, and the vaporizer temperature was maintained at 160 C. A soda-lime-silica glass substrate two inches square and 2.2 mm thick was preheated on a heater block to 663° C. Precursor vapors were directed onto the glass substrate at a velocity of ~1.2 m/s and an antimony doped tin oxide film of ~240 nm was deposited at a rate of ~1050 Å/sec. Immediately after this deposition, a fluorine doped tin oxide layer of ~300 nm was deposited at the same rate from a vapor composition of 1.5 mol percent TFA/MBTC (5% by weight TFA and 95% by weight MBTC), 1.5 mol percent water vapor and the remainder air. The bilayer film was blue-green in reflected color and had a haze value of 1.13% as measured on a Gardner Hazemeter.

EXAMPLE 55

The procedure of Example 54 was repeated but water was omitted from the vapor stream during the deposition of the first ~300–600 Å of the antimony doped tin oxide first layer. The resulting film had a measured haze of 0.90%, a 20% reduction from the previous Example.

EXAMPLE 56

The procedure of Example 55 was repeated but 5% by weight TFA was added to the precursor solution during the deposition of the first ~300–600 Å of the antimony doped tin oxide first layer. The resulting film had a measured haze of 0.70%, a 23% reduction from the previous Example.

EXAMPLE 57

The procedure of Example 54 was repeated but 5% by weight TFA was added to the precursor solution used for the deposition of the antimony doped tin oxide first layer. The resulting bilayer film had a measured haze of 0.72%, a 36% reduction from the haze measured in Example 54.

The following examples illustrate the haze obtained when the bilayer film is deposited in reverse order.

EXAMPLE 58

The procedure of Example 31 was repeated with the following changes. The precursor coating composition for the underlayer was composed of 5.0% by weight TFA and 95% by weight MBTC. The carrier gas used for the vaporization was dry air at a rate of 20 l/min. The precursor solution was added at a rate of 1.5 mol percent of total carrier gas flow, the water was added at a rate of 1.5 mol percent of total carrier gas flow, and the vaporizer temperature was maintained at 160 C. A soda-lime-silica glass substrate two inches square and 2.2 mm thick was preheated on a heater block to 663° C. Precursor vapors were directed onto the glass substrate at a velocity of ~1.2 m/s and a fluorine doped tin oxide film of ~300 nm was deposited at a rate of ~1050 Å/sec. Immediately after this deposition, an antimony doped tin oxide layer of ~240 nm was deposited at the same rate from a vapor composition of 1.5 mol percent $SbCl_3$/MBTC (6.75% by weight $SbCl_3$ and 93.25% by weight MBTC), 1.5 mol percent water vapor and the remainder air. The resulting bilayer film was neutral blue in reflected color and had a haze value of 0.68% as measured on a Gardner Hazemeter.

EXAMPLE 59

The procedure of Example 58 was repeated, but 5% by weight TFA was added to the precursor solution used for the deposition of the antimony doped tin oxide first layer. The resulting bilayer film was a neutral blue in reflected color and had a haze value of 0.67%.

EXAMPLE 60

The procedure of Example 54 was repeated, but 2.9% by weight acetic acid was added to a 5.75% by weight $SbCl_3$/MBTC precursor solution used for the deposition of the antimony doped tin oxide first layer. The resulting bilayer film was a neutral blue in reflected color and had a haze value of 0.95%.

COMPARATIVE EXAMPLE 61

The procedure of Example 60 was repeated, but with no acetic acid in the precursor solution. The resulting bilayer film was a neutral blue in reflected color and had a haze value of 1.37%.

The results of examples 48 to 61 are given in Tables 4 and 5

TABLE 4

Effects of TFA &/or H$_2$O On Haze of Bilayer Films

| Ex. # | 48 | 49 | 50 | 51 | 52 | 53 | 54 | 55 | 56 | 57 | 58 | 59 |
|---|---|---|---|---|---|---|---|---|---|---|---|---|
| Composit.* | 2 | 2 | 1 | 1 | 2 | 2 | 1 | 1 | 2 | 2 | 3 | 4 |
| % SbCl3 | 4.35 | 4.35 | 6.75 | 6.75 | 6.75 | 6.75 | 6.75 | 6.75 | 6.75 | 6.75 | 6.75 | 6.75 |
| % TFA | 5 | 5 | 0 | 0 | 5 | 5 | 0 | 0 | 5 | 5 | 0 | 5 |
| 1$^{st}$ 30–60 nm | Y | Y | N | N | Y | Y | N | N | Y | Y | N | Y |
| In rest | Y | Y | N | N | N | Y | N | N | N | Y | N | Y |
| H$_2$O/Sn | 5 | 5 | 5 | 5 | 5 | 5 | 1 | 1 | 1 | 1 | 1 | 1 |
| 1$^{st}$ 30–60 nm | Y | N | Y | N | N | Y | Y | N | N | Y | Y | Y |
| In rest | Y | Y | Y | Y | Y | Y | Y | Y | Y | Y | Y | Y |
| Rate (Å/s) | ~1200 | ~1200 | ~1200 | ~1200 | ~1200 | ~1200 | ~1050 | ~1050 | ~1050 | ~1050 | ~1050 | ~1050 |
| Temp. ° C. | 640 | 640 | 648 | 648 | 648 | 648 | 663 | 663 | 663 | 663 | 663 | 663 |
| % Haze | 1.20 | 0.97 | 1.34 | 0.90 | 0.83 | 1.17 | 1.13 | 0.90 | 0.70 | 0.72 | 0.68 | 0.67 |

*Composition:
1 = 300 nm TOF/240 nm TOSb/G
2 = 300 nm TOF/240 nm TOSbF/G
3 = 240 nm TOSb/300 nm TOF/G
4 = 240 nm TOSbF/300 nm TOF/G

TABLE 5

Effects of Acetic Acid On Haze of Bilayer Films

| Ex. # | 60 | 61 |
|---|---|---|
| Composit.* | 2 | 2 |
| % SbCl3 | 5.75 | 5.75 |
| % HAc | 2.9 | 0 |
| 1$^{st}$ 30–60 nm | Y | N |
| In rest | Y | N |
| H$_2$O/Sn | 1 | 1 |
| 1$^{st}$ 30–60 nm | Y | Y |
| In rest | Y | Y |
| Rate (Å/s) | ~1050 | ~1050 |
| Temp. ° C. | 663 | 663 |
| % Haze | 1.37 | 0.95 |

*Composition:
1 = 300 nm TOF/240 nm TOSb/G
2 = 300 nm TOF/240 nm TOSb F/G
3 = 240 nm TOSb/300 nm TOF/G
4 = 240 nm TOSb F/300 nm TOF/G Silica can also function as a haze reducing additive in the tin oxide NIR layer adjacent to the glass especially when added to the top portion of the NIR layer prior to the deposition of the low E layer on top of the NIR layer. The preferred silica precursor is tetramethylcyclotetrasiloxane (TMCTS). A 33% haze reduction was obtained when TMCTS was used in the last ~600 Å of the undercoat. Examples 62 and 63 and the results thereof in Table 6 illustrate the effects of silica as a haze reducing additive in the antimony doped tin oxide layer.

EXAMPLE 62

The procedure of Example 1 was repeated with the following changes. The precursor coating composition for the NIR layer was composed of two solutions, a 5.75% by weight SbCl3 with the remainder MBTC fed to both vaporizers and a neat solution of tetramethylcyclotetrasiloxane (TMCTS) fed only to the second vaporizer. The carrier gas used for the vaporization was dry air at a rate of 15 l/min. The antimony/tin precursor was added at a rate of 0.5 mol percent of total carrier gas flow, the water was added in the upstream mixing section of the coater at a rate of 1.5 mol percent in total carrier gas flow, and the vaporizer temperature was maintained at 160° C. When the TMCTS was used, it was fed at a rate of 0.05 mol %. A soda-lime-silica glass substrate two inches square and 2.2 mm thick was preheated on a heater block to 663° C. NIR layer precursor vapors were directed onto the glass substrate at a velocity of ~0.88 m/s and an antimony doped tin oxide film of ~185 nm was deposited at a rate of ~55 nm/sec. Immediately after this deposition, an antimony doped tin oxide film containing silica was deposited from the second vaporizer at the same rate to a thickness of ~61 nm. This was followed by a fluorine doped tin oxide layer of ~298 nm which was deposited from the first vaporizer at the same rate from a vapor composition of 0.5 mol percent TFA/MBTC (5% by weight TFA and 95% by weight MBTC), 1.5 mol percent water vapor and the remainder air. The deposited film was neutral blue in reflected color and had a haze value of 0.81% as measured on a Gardner Hazemeter.

COMPARATIVE EXAMPLE 63

The procedure of Example 62 was repeated except that the antimony doped tin oxide layer was 223 nm thick, no silica containing layer was deposited, and the TOF layer was 291 nm. The resulting film had a haze value of 1.20% as measured on the Gardner Hazemeter.

TABLE 6

Effect of TMCTS On Haze of Solar Control Films

| Ex. # | 62 | 63 |
|---|---|---|
| Composition | TOF/TOSb-Si/TOSb/G | TOF/TOSb/G |
| % SbCl3 | 5.75 | 5.75 |
| TOSb nm | 185 | 223 |
| mol TMCTS/mol Sn | 0.1 | 0 |
| TOSb-Si nm | 61 | 0 |
| TOF nm | 298 | 291 |
| Rate (Å/s) | ~550 | ~550 |

TABLE 6-continued

Effect of TMCTS On Haze of Solar Control Films

| Ex. # | 62 | 63 |
|---|---|---|
| Temp. ° C. | 663 | 663 |
| % Haze | 0.81 | 1.20 |

We claim:

1. A tin oxide coated, solar control glass having low haze of less than about 2.0% and having a NIR solar absorbing layer and a low emissivity layer within said tin oxide coating, comprising a glass substrate and a doped tin oxide coating having at least two layers with one layer being a solar absorbing layer comprising $SnO_2$ containing a dopant selected from the group consisting of antimony, tungsten, vanadium, iron, chromium, molybdenum, niobium, cobalt, nickel and mixtures thereof and another layer being a low emissivity layer comprising $SnO_2$ containing a dopant of fluorine or phosphorous and, wherein a portion of said solar absorbing layer contains fluorine in sufficient quantity to reduce the rugosity and haze for said tin oxide coating and wherein the thickness of the NIR solar absorbing layer is from 200 to 320 nanometers (nm) and the thickness of the low emissivity layer is from 200 to 450 nm and the portion of said solar absorbing layer containing fluorine to reduce the rugosity comprises from 300 Angstroms (Å) to 600 Å of the thickness of the solar absorbing layer and is located either adjacent to the interface between the solar absorbing layer and the low emissivity layer, or is the portion of the solar absorbing layer that is closest to the glass substrate.

2. The coated glass of claim 1 wherein the thickness of the NIR solar absorbing layer is from 200 to 320 nanometers (nm) and the thickness of the low emissivity layer is from 200 to 450 nm and the portion of said solar absorbing layer having reduced rugosity comprises the pyrolytic decomposition product of an anhydrous (dry) mixture containing the precursor of antimony in addition to fluorine.

3. The coated glass of claim 1 wherein said solar absorbing layer is located closer to the glass substrate than the low emissivity layer.

4. The coated glass of claim 1 wherein said solar absorbing layer has a thickness from 220 to 260 nm, an antimony dopant concentration of from 2.5% to 7% by weight in said solar absorbing layer based upon the weight of $SnO_2$ in said solar absorbing layer, and the low emissivity layer has a thickness of from 280 to 320 nm, a fluorine dopant concentration of from 1% to 5% by weight in said low emissivity layer based upon the weight of $SnO_2$ in said low emissivity layer.

5. The glass of claim 1 wherein the solar absorbing layer is coated directly onto the glass and the low emissivity layer is coated on top of the solar absorbing layer.

6. The glass of claim 1 wherein the solar absorbing layer is $SnO_2$ having an antimony dopant within the range of 3% to 6% by weight based upon the weight of $SnO_2$ tin oxide in the solar control layer, the low emissivity control layer is $SnO_2$ having a fluorine dopant within range of 1% to 3% dopant by weight based upon the weight of $SnO_2$ in the low emissivity layer and said portion of said solar absorbing layer imparting reduced rugosity contains fluorine in sufficient quantity to raise the conductivity of said portion of the solar absorbing layer.

7. A tin oxide coated, solar control glass having low haze and having a NIR solar absorbing layer and a low emissivity layer within said tin oxide coating, comprising a glass substrate and a doped tin oxide coating having at least two layers with one layer being a solar absorbing layer comprising an antimony doped $SnO_2$ and another layer being a low emissivity layer comprising $SnO_2$ containing a dopant of fluorine or phosphorous and, wherein a portion of said solar absorbing layer contains fluorine in sufficient quantity to reduce the rugosity and haze for said tin oxide coating and wherein the thickness of the NIR solar absorbing layer is from 200 to 300 nanometers (nm) and the thickness of the low emissivity layer is from 200 to 400 nm and the portion of said solar absorbing layer containing fluorine to reduce the rugosity comprises from 300 Angstroms (Å) to 600 Å of the thickness of the solar absorbing layer and is located either adjacent to the interface between the solar absorbing layer and the low emissivity layer, or is the portion of the solar absorbing layer that is closest to the glass substrate.

8. The coated, solar control glass of claim 2 wherein said solar absorbing layer has a thickness from 200 to 320 nm, an antimony dopant concentration of from 2.5% to 7% by weight in said solar absorbing layer based upon the weight of $SnO_2$ in said solar absorbing layer, and the low emissivity layer has a thickness of from 200 to 450 nm, a fluorine dopant concentration of from 1% to 5% by weight in said low emissivity layer based upon the weight of $SnO_2$ in said low emissivity layer.

9. The coated glass of claim 1 wherein the solar absorbing layer is coated directly onto the glass and the low emissivity layer is coated on top of the solar control layer.

10. The coated glass of claim 1 further comprising an additional film coating the glass either between the glass substrate and the tin oxide coating or above the tin oxide coating.

11. The coated glass of claim 1 wherein the $SnO_2$ layers is a pyrolytic decomposition of a tin precursor.

12. The coated glass of claim 11 wherein the tin precursor is selected from the group consisting of monobutyltin trichloride, methyltin trichloride, dimethyltin dichloride, dibutyltin diacetate, and tin tetrachloride.

13. The coated glass of claim 1 wherein the solar absorbing layer is composed of at least two solar absorbing films and the total thickness of the solar absorbing films is from 80 to 320 nm.

14. The coated glass of claim 13 wherein the concentration of dopant in one of said solar absorbing films is different than the concentration of dopant in another of the solar absorbing films.

15. The coated glass of claim 1 wherein the low emissivity layer is composed of at least two low emissivity films and the total thickness of the low emissivity films is from 200 to 450 nm.

16. The coated glass of claim 15 wherein the concentration of dopant in one of said low emissivity films is different than the concentration of dopant in another of the low emissivity films.

17. The coated glass of claim 1 further comprising a transmitted color modifying quantity of a dopant in said solar absorbing layer.

18. The coated glass of claim 17 wherein said color modifying dopant is fluorine.

* * * * *